(12) United States Patent
Fehlings

(10) Patent No.: US 12,498,370 B2
(45) Date of Patent: Dec. 16, 2025

(54) ANALYSIS OF CELL POPULATIONS

(71) Applicant: ImmunoSCAPE Pte. Ltd., Singapore (SG)

(72) Inventor: Michael Fehlings, Singapore (SG)

(73) Assignee: ImmunoSCAPE Pte. Ltd., Singapore (SG)

( * ) Notice: Subject to any disclaimer, the term of this patent is extended or adjusted under 35 U.S.C. 154(b) by 850 days.

(21) Appl. No.: 17/622,211

(22) PCT Filed: Jun. 30, 2020

(86) PCT No.: PCT/EP2020/068330
§ 371 (c)(1),
(2) Date: Dec. 22, 2021

(87) PCT Pub. No.: WO2021/001335
PCT Pub. Date: Jan. 7, 2021

(65) Prior Publication Data
US 2022/0236271 A1 Jul. 28, 2022

(30) Foreign Application Priority Data
Jul. 1, 2019 (SG) .......................... 10201906127S

(51) Int. Cl.
| | |
|---|---|
| *G01N 33/569* | (2006.01) |
| *G01N 15/14* | (2006.01) |
| *G01N 33/543* | (2006.01) |
| *G01N 33/58* | (2006.01) |
| *G01N 15/10* | (2006.01) |
| *G01N 21/64* | (2006.01) |

(52) U.S. Cl.
CPC ... *G01N 33/56972* (2013.01); *G01N 15/1459* (2013.01); *G01N 33/54326* (2013.01); *G01N 33/582* (2013.01); *G01N 2015/1006* (2013.01); *G01N 2021/6441* (2013.01)

(58) Field of Classification Search
CPC ............................................... G01N 33/56972
See application file for complete search history.

(56) References Cited

PUBLICATIONS

International Preliminary Report on Patentability for Application No. PCT/EP2020/068330, mailed Jan. 13, 2022.
International Search Report and Written Opinion for Application No. PCT/EP2020/068330, mailed Sep. 16, 2020.
No Author Listed, 34th Annual Meeting & Pre-Conference Programs of the Society for Immunotherapy of Cancer (SITC 2019): part 1. Journal for Immuno Therapy of Cancer. 2019; 7(Suppl 1):282. https://doi.org/10.1186/s40425-019-0763-1.
Baumgart et al., Dual-labelled antibodies for flow and mass cytometry: A new tool for cross-platform comparison and enrichment of target cells for mass cytometry. Eur J Immunol. Aug. 2017;47(8):1377-1385. doi: 10.1002/eji.201747031. Epub Jul. 18, 2017.
Cavrois et al., Mass Cytometric Analysis of HIV Entry, Replication, and Remodeling in Tissue CD4+ T Cells. Cell Rep. Jul. 25, 2017;20(4):984-998. doi: 10.1016/j.celrep.2017.06.087.
Gubin et al., High-Dimensional Analysis Delineates Myeloid and Lymphoid Compartment Remodeling during Successful Immune-Checkpoint Cancer Therapy. Cell. Nov. 1, 2018;175(4):1014-1030. e19. doi: 10.1016/j.cell.2018.09.030. Epub Oct. 18, 2018.
Newell et al., Combinatorial tetramer staining and mass cytometry analysis facilitate T-cell epitope mapping and characterization. Nat Biotechnol. Jul. 2013;31(7):623-9. doi: 10.1038/nbt.2593. Epub Jun. 9, 2013.
Newell et al., Supplementary Data: Combinatorial tetramer staining and mass cytometry analysis facilitate T-cell epitope mapping and characterization. Nat Biotechnol. Jul. 2013;31(7):623-9. doi: 10.1038/nbt.2593. Epub Jun. 9, 2013.
Selimoglu-Buet et al., Characteristic repartition of monocyte subsets as a diagnostic signature of chronic myelomonocytic leukemia. Blood. Jun. 4, 2015;125(23):3618-26. doi: 10.1182/blood-2015-01-620781. Epub Apr. 7, 2015.
Baecher-Allan et al., Functional analysis of highly defined, FACS-isolated populations of human regulatory CD4+CD25+ T cells. Clin Immunol. Nov. 2005;117(2):192; discussion 193. doi: 10.1016/j.clim.2005.08.008.

*Primary Examiner* — Albert M Navarro
*Assistant Examiner* — Mark Navarro
(74) *Attorney, Agent, or Firm* — Wolf, Greenfield & Sacks, P.C.

(57) ABSTRACT

Methods for evaluating the expression of one or more molecules of interest by cell types of interest within a heterogeneous population of cells are provided, comprising: (i) sorting cells of the heterogeneous population of cells into two or more cell types based on expression of one or more cell type markers by the cells; (ii) labelling the cells with target-binding molecules capable of binding to one or more molecules of interest; and (iii) analysing the cells in order to determine expression of the one or more molecules of interest by the one or more cell types of interest.

20 Claims, 13 Drawing Sheets

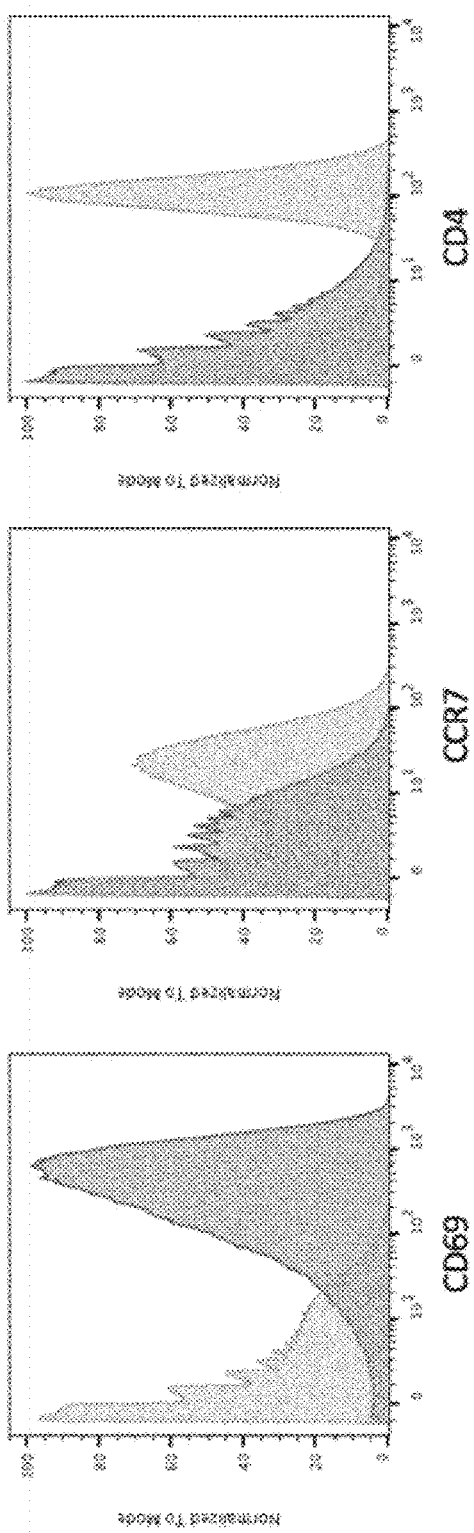
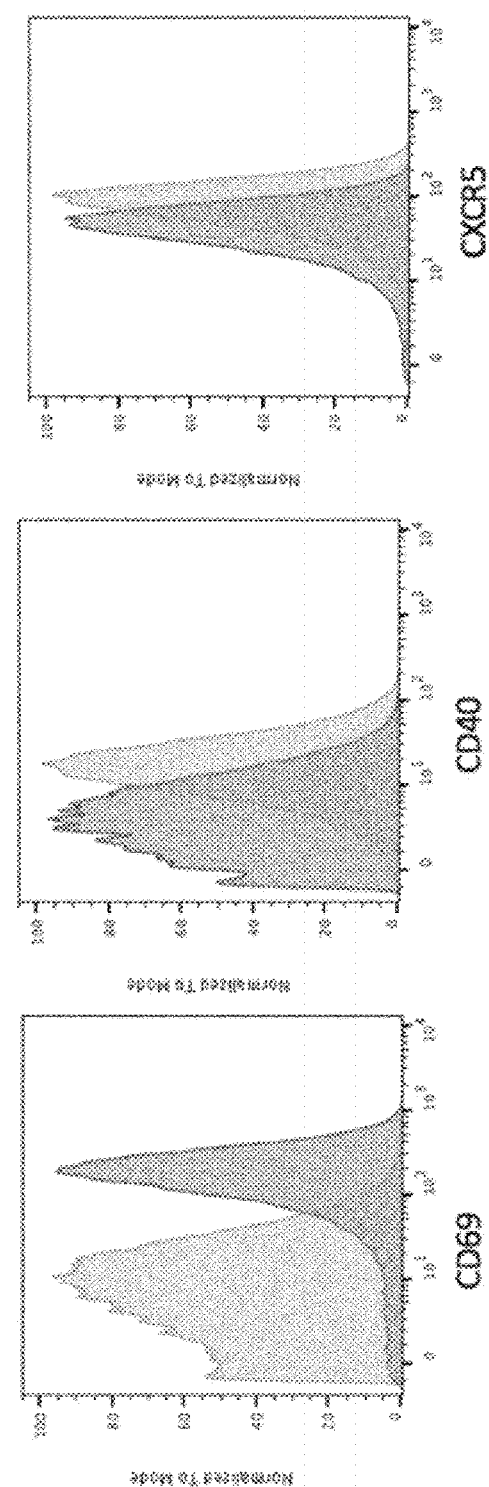
Figure 4A
Figure 4B

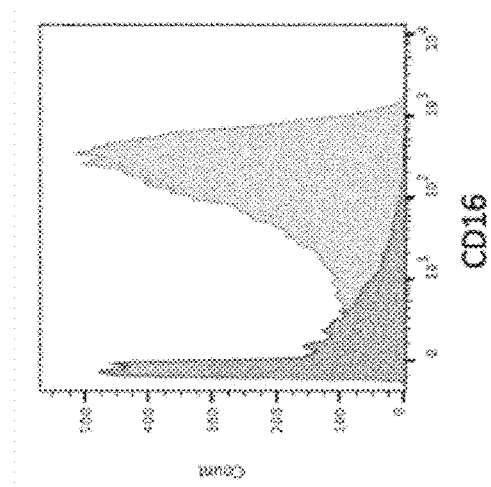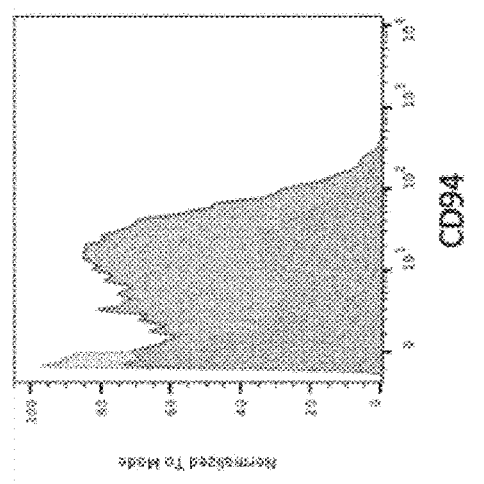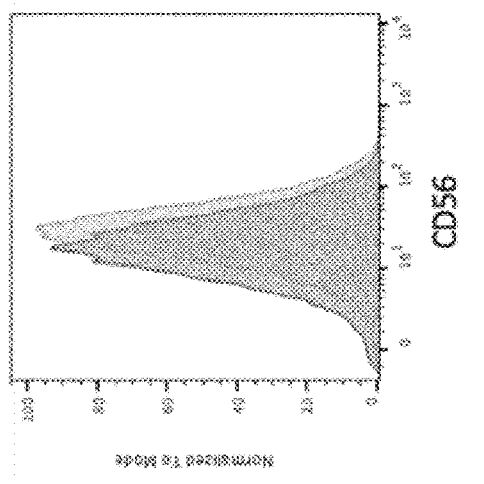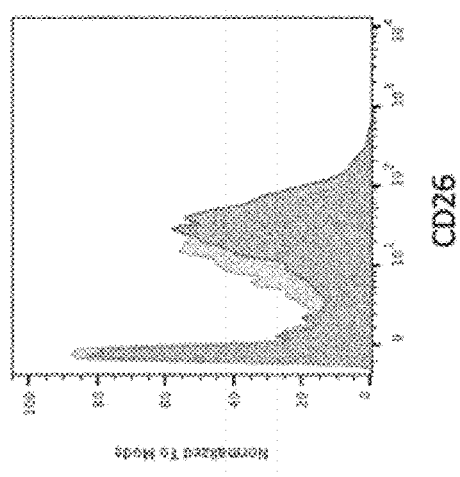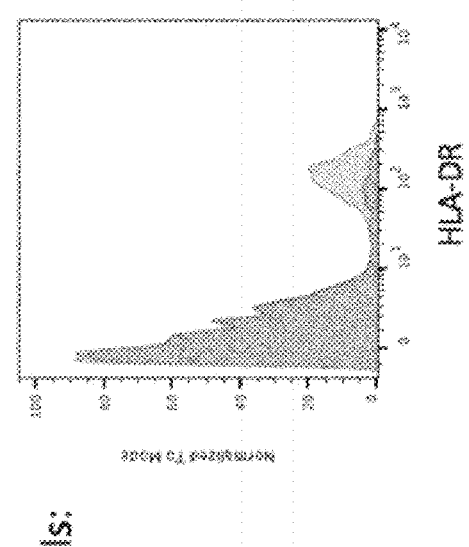
Figure 4C
Figure 4D

ANALYSIS OF CELL POPULATIONS

RELATED APPLICATIONS

This application is a national stage filing under 35 U.S.C. 371 of International Patent Application Serial No. PCT/EP2020/068330, filed Jun. 30, 2020, which claims priority to Singapore application number 10201906127S, filed Jul. 1, 2019, the contents of each of which are herein incorporated by reference in their entirety.

FIELD OF THE INVENTION

The present invention relates to the fields of cytometry, immunology and cell biology.

BACKGROUND TO THE INVENTION

Contemporary techniques for phenotypic analysis of cell populations are described e.g. in Bendall et al., Trends Immunol. (2012) 33(7):323-332, and include analysis by flow cytometry and mass cytometry. However, these techniques have limitations.

Flow cytometry employs laser excitation and subsequent detection and evaluation of light scatter and emission spectra to determine characteristics of cells with high throughput (25,000 cells per second). Cells can be stained with antibodies that bind specifically to molecules of interest, and the antibodies can be labelled e.g. by conjugation to a fluorophore. Cells expressing the molecules of interest can be identified by detection of signal emitted by the fluorophore following excitation of the cell with a laser within the excitation spectrum of the fluorophore. However, due to the limited number of fluorophores and overlap between excitation and emission spectra, even next generation flow cytometry techniques are capable of analysing populations of cells for expression of a limited number of individual markers (~30).

Analysis of populations of cells by mass cytometry employs antibodies conjugated to elemental metal isotopes. Stained cells are introduced into an inductively coupled mass spectrometer by droplet nebulisation, and the elemental isotopes are detected and correlated with the presence of the molecules. Mass cytometry is able to detect discrete isotope peaks without significant overlap, and so cells can be analysed for a larger number of markers than by flow cytometry (~40), albeit with lower throughput (~500-1,000 cells per second).

Single cell sequencing methods such as CITE-Seq (described e.g. in Stoeckius et al., Nature Methods (2017), 14:865-868) use oligonucleotide-conjugated antibodies to detect molecules of interest expressed by single cells, and expression can be detected by sequencing and detection of the oligonucleotide sequences. Such methods provide for high-resolution profiling of cells for potentially hundreds of markers, but with much lower throughput; only a few thousand cells can be analysed by CITE-Seq in a single experiment, compared to the millions of cells that can be evaluated by flow cytometry or mass cytometry. This low throughput especially impedes the characterisation of rare cell subsets within heterogeneous populations of cells.

Thus current techniques provide either for low-resolution phenotyping of large numbers of cells with high throughput, or high-resolution phenotyping of a small number of cells with low throughput. There remains a need in the art for improved methods for phenotypic analysis of populations of cells.

SUMMARY OF THE INVENTION

In a first aspect, the present invention provides a method for evaluating the expression of one or more molecules of interest by one or more cell types of interest within a heterogeneous population of cells, comprising:
  (i) sorting cells of the heterogeneous population of cells into two or more cell types based on expression of one or more cell type markers by the cells;
  (ii) labelling the cells with target-binding molecules capable of binding to one or more molecules of interest; and
  (iii) analysing the cells in order to determine expression of the one or more molecules of interest by the one or more cell types of interest.

In some embodiments, labelling the cells with target-binding molecules capable of binding to one or more molecules of interest comprises labelling different sorted cell types with target-binding molecules capable of binding to non-identical molecules of interest.

In some embodiments, the method further comprises labelling the sorted cell types with one or more cell type-specific identifiers prior to analysis at step (iii).

In some embodiments, the method comprises mixing together the sorted, labelled cells of different cell types prior to analysis at step (iv).

In some embodiments, the heterogeneous population of cells is sorted into the two or more cell types by fluorescence activated cell sorting (FACS).

In some embodiments, labelling the cells with target-binding molecules capable of binding to one or more molecules of interest comprises labelling the cells with target-binding molecules capable of binding to one or more molecules of interest using target-binding molecules conjugated to non-identical elemental isotopes. In some embodiments, labelling the cells with target-binding molecules capable of binding to one or more molecules of interest comprises labelling the cells with target-binding molecules capable of binding to one or more molecules of interest using target-binding molecules conjugated to non-identical fluorophores.

In some embodiments, labelling the sorted cell types with one or more cell type-specific identifiers comprises labelling the different sorted cell types using target-binding molecules conjugated to non-identical elemental isotopes. In some embodiments, labelling the sorted cell types with one or more cell type-specific identifiers comprises labelling the different sorted cell types using target-binding molecules conjugated to non-identical fluorophores.

In some embodiments, analysing the cells in order to determine expression of the one or more molecules of interest by the cell types comprises analysis by mass cytometry. In some embodiments, analysing the cells in order to determine expression of the one or more molecules of interest by the cell types comprises analysis by flow cytometry.

In another aspect, the present invention provides a method for evaluating the expression of one or more molecules of interest by one or more cell types of interest within a heterogeneous population of cells, comprising:
  (i) sorting cells of the heterogeneous population of cells into two or more cell types based on expression of one or more cell type markers by the cells as determined by flow cytometry;
  (ii) labelling the cells with target-binding molecules capable of binding to one or more molecules of interest, using target-binding molecules conjugated to non-identical elemental isotopes; and (iii) analysing the cells by mass cytometry in order to determine expression of the one or more molecules of interest by the one or more cell types of interest.

In some embodiments, labelling the cells with target-binding molecules capable of binding to one or more molecules of interest using target-binding molecules conjugated to non-identical elemental isotopes comprises labelling different sorted cell types with target-binding molecules capable of binding to non-identical molecules of interest.

In some embodiments, the method further comprises labelling the sorted cell types with target-binding molecules conjugated to an elemental isotope, wherein the different sorted cell types are labelled with target-binding molecules conjugated to non-identical elemental isotopes prior to analysis at step (iii).

In another aspect, the present invention provides a method for evaluating the expression of one or more molecules of interest by one or more cell types of interest within a heterogeneous population of cells, comprising:
  (i) sorting cells of the heterogeneous population of cells into two or more cell types based on expression of one or more cell type markers by the cells as determined by flow cytometry;
  (iii) labelling the cells with target-binding molecules capable of binding to one or more molecules of interest, using target-binding molecules conjugated to non-identical fluorophores; and
  (iv) analysing the cells by flow cytometry in order to determine expression of the one or more molecules of interest by the one or more cell types of interest.

In some embodiments, labelling the cells with target-binding molecules capable of binding to one or more molecules of interest using target-binding molecules conjugated to non-identical fluorophores comprises labelling different sorted cell types with target-binding molecules capable of binding to non-identical molecules of interest.

In some embodiments, the method further comprises labelling the sorted cell types with target-binding molecules conjugated to a fluorophores, wherein the different sorted cell types are labelled with target-binding molecules conjugated to non-identical fluorophores prior to analysis at step (iii).

In some embodiments, the method comprises mixing together the sorted, labelled cells of different cell types prior to analysis at step (iii).

In some embodiments in accordance with various aspects of the present invention, the method comprises analysing two or more heterogeneous populations of cells, and additionally comprises labelling one or more of the heterogeneous populations of cells with a population-specific identifier.

In another aspect, the present invention provides a method for evaluating the expression of one or more molecules of interest by one or more cell types of interest within two or more heterogeneous populations of cells, comprising:
  (i) labelling the cells of one or more of the heterogeneous populations of cells with a population-specific identifier;
  (ii) sorting cells of the heterogeneous populations of cells into two or more cell types based on expression of one or more cell type markers by the cells;
  (iii) labelling the cells with target-binding molecules capable of binding to one or more molecules of interest; and
  (iv) analysing the cells in order to determine expression of the one or more molecules of interest by the one or more cell types of interest.

In some embodiments, labelling the cells with target-binding molecules capable of binding to one or more molecules of interest comprises labelling different sorted cell types with target-binding molecules capable of binding to non-identical molecules of interest.

In some embodiments, the method further comprises labelling the sorted cell types with one or more cell type-specific identifiers prior to analysis at step (iv).

In some embodiments, the method comprises mixing together the sorted, labelled cells of different cell types prior to analysis at step (iv).

In some embodiments, the method comprises mixing together sorted, labelled cells of the same type from the two or more heterogeneous populations of cells prior to analysis at step (iv).

In some embodiments in accordance with various aspects of the present invention, the method additionally comprises mixing the labelled cell types with buffer cells.

In some embodiments the buffer cells are labelled with target-binding molecules conjugated to magnetic beads.

In some embodiments the method additionally comprises separating the buffer cells from cells of the heterogeneous population of cells prior to analysing the cells in order to determine expression of the one or more molecules of interest.

In some embodiments in accordance with various aspects of the present invention, the heterogeneous population of cells is a population of immune cells.

In some embodiments the heterogeneous population of cells is a population of peripheral blood mononuclear cells (PBMCs).

DESCRIPTION

The method of the present invention provides for high-throughput and highly-parametric analysis of heterogeneous populations of cells.

Specifically, the methods of the present invention employ combinations of cytometric techniques and the use of identifiers in a complementary fashion, or order to achieve high-resolution profiling of heterogeneous cell populations with high-throughput. This is particularly useful in the context of immunoprofiling.

Advantageously, the methods of the present disclosure provide for the analysis of a given population of cells for a greater number of molecules of interest as compared to prior art methods.

The methods of the present disclosure also provide for the analysis of a greater number of different cell types within a given heterogeneous population of cells, for a greater number of molecules of interest, as compared to prior art methods.

Thus the present methods provide for high-throughput characterisation of heterogeneous populations of cells with exquisite resolution and sensitivity with respect to rare cell populations.

Cytometric Methods

The methods of the present invention comprise analysing populations of cells for certain characteristics. Such analysis is commonly referred to as cytometric analysis. Characteristics of cells which can be analysed by cytometric techniques include the number, size, morphology, phase of the replicative cycle, nucleic acid content, viability and intracellular and/or surface expression of molecules of interest (e.g. peptides/polypeptides, glycoproteins, lipoproteins, glycans, glycolipids, lipids etc.).

Cytometric techniques are well known in the art, and are reviewed comprehensively in Cossarizza et al., Eur. J. Immunol. (2017) 47:1584-1797, and also in Bendall et al. Trends Immunol. 2012 July; 33(7): 323-332, both of which are hereby incorporated by reference in their entirety.

In some embodiments the methods of the present invention comprise labelling/staining cells with target-binding molecules capable of binding to, and/or analysing cells for expression of, one or more molecules of interest.

Herein, evaluating the "expression" of a given molecule may comprise determining the presence, absence and/or quantity of the molecule in a given cell/plurality of cells. In some embodiments, expression of a given molecule by a cell/plurality of cells is evaluated based on detection of the molecule. In some embodiments, a cell/plurality of cells is determined not to express a given molecule based on the molecule not being detected. In some embodiments, a cell/plurality of cells is determined to express a given molecule, or is determined to have high expression of a given molecule, based on detection of a quantity of the molecule which is greater than a pre-defined threshold. In some embodiments, a cell/plurality of cells is determined not to express a given molecule, or is determined to have low expression of a given molecule, based on detection of a quantity of the molecule which is less than a pre-defined threshold. A pre-defined threshold may be the quantity detected for an appropriate control condition.

A "target-binding molecule" refers to a molecule which is capable of binding to a target molecule. The target molecule for a target-binding molecule may be any molecule, e.g. a molecule of interest as described herein.

Target-binding molecules include antibodies (immunoglobulins) such as monoclonal antibodies, polyclonal antibodies, monospecific antibodies, multispecific antibodies (e.g., bispecific antibodies), and fragments and derivatives thereof (e.g. Fv, scFv, Fab, scFab, F(ab')$_2$, Fab$_2$, diabodies, triabodies, scFv-Fc, minibodies, single domain antibodies (e.g. VhH), etc.).

Target-binding molecules also include nucleic acid aptamers (reviewed e.g. in Zhou and Rossi Nat Rev Drug Discov. 2017 16(3):181-202), and target-binding peptides/polypeptides, e.g. peptide aptamers, thioredoxins, monobodies, anticalin, Kunitz domains, avimers, knottins, fynomers, atrimers, DARPins, affibodies, nanobodies (i.e. single-domain antibodies (sdAbs)) affilins, armadillo repeat proteins (ArmRPs), OBodies and fibronectin—reviewed e.g. in Reverdatto et al., Curr Top Med Chem. 2015; 15(12): 1082-1101, which is hereby incorporated by reference in its entirety (see also e.g. Boersma et al., J Biol Chem (2011) 286:41273-85 and Emanuel et al., Mabs (2011) 3:38-48).

Target-binding peptides/polypeptides also include e.g. interaction partners for the target molecule, e.g. ligands/binding partners, and target-binding fragments thereof. For example, target-binding molecules include MHC-peptide complexes and multimeric complexes thereof (e.g. where the target molecule is a T cell receptor (TCR) specific for a given MHC-peptide complex).

Target-binding molecules which are capable of binding to a target may display specific binding to the target. As used herein, "specific binding" refers to binding which is selective for the antigen, and which can be discriminated from non-specific binding to non-target. A target-binding molecule that specifically binds to a target molecule preferably binds the target with greater affinity, and/or with greater duration than it binds to other, non-target molecules. Target-binding molecules which display specific binding to a target may be described as being "specific for" the target.

As is appreciated in the art, "staining" or "labelling" cells with target-binding molecules refers to incubating cells with target-binding molecules, under conditions allowing for specific binding of the target-binding molecules to the antigen for which they are specific. The target-binding molecules may be directly or indirectly labelled with a detectable moiety, enabling the presence/absence/level of expression of the antigen to be determined.

Depending on the subcellular location of the antigen it may be desirable or necessary to permeabilise the cells in order to ensure that the target-binding molecules are able to contact the antigen. Cells are then typically washed in order to remove unbound target-binding molecules. Techniques for labelling/staining cells with target-binding molecules for subsequent analysis by cytometric methods are well known to the skilled person.

Target-binding molecules may be directly or indirectly labelled with a detectable moiety. The detectable moiety is selected as appropriate to the cytometric technique(s) employed in the method.

Target-binding molecules may be directly labelled with a detectable moiety by means well known in the art, such as e.g. covalent conjugation of the fluorophore to the target-binding molecule through amine or thiol groups. See e.g. Mao and Mullins, Methods Mol Biol. (2010) 588:43-8 (hereby incorporated by reference in its entirety). Target-binding molecules may be labelled with elemental isotopes e.g. using bifunctional chelating agents, which may comprise DOTA or DTPA enabling the chelation of metal cations, and a maleimide-functionalised group for coupling to sulfhydryl groups of the target-binding molecules. See e.g. Han et al., Nature Protocols (2018), 13: 2121-2148 (hereby incorporated by reference in its entirety). Target-binding molecules comprising a detectable moiety may be described as comprising a "tag".

Target-binding molecules may be indirectly labelled with a fluorophore or an elemental isotope, e.g. using a target-binding molecule conjugated to a detectable moiety, which is capable of binding to the target-binding molecule capable of binding to an antigen of interest. For example, a target-binding molecule conjugated to a fluorophore/elemental isotope tag may be capable of specific binding to the Fc region of an antibody specific for an antigen of interest.

Other means of indirectly labelling target-binding molecules with detectable moieties are well known in the art, and include e.g. the use of affinity tags as intermediaries. One example is the use of biotin-labelled target-binding molecules specific for an antigen of interest with an avidin/streptavidin-linked fluorophore/elemental isotope tag.

Cells which have been subjected to staining/labelling with a given target-binding molecule may be referred to as having been stained/labelled with the target-binding molecule.

In some embodiments, target-binding molecules may be directly or indirectly labelled with a fluorophore. The fluorophore may be suitable for detection by flow cytometry.

In some embodiments, target-binding molecules may be directly or indirectly labelled with an elemental isotope tag.

In the present specification, an elemental isotope may be any elemental isotope suitable for detection by mass cytometry. In some embodiments the elemental isotope is a stable isotope of an elemental metal. In some embodiments, the elemental isotope is an isotope of a transition metal (e.g. Y, Pd, Rh, Pt, Ir), a lanthanide (e.g. La, Ce, Pr, Nd, Sm, Eu, Gd, Tb, Dy, Ho, Er, Yb, Lu), or a post-transition metal (e.g. Cd, In, Bi). In some embodiments, the elemental isotope is selected from an elemental isotope shown in the Table of Example 1.

Other detectable moieties that may be employed in the target-binding molecules of the present disclosure include luminescent, immuno-detectable, radio, chemical, nucleic acid or enzymatic labels, and His, (e.g. 6×His), Myc, GST, MBP, FLAG, HA, E, or Biotin tags.

Flow Cytometry

Analysis of populations of cells by flow cytometry generally involves excitation of cells with one or more lasers. Analysis of the scattered light can provide information relating e.g. to the size and/or morphology of the cells, and analysis of the emitted light can provide information relating to further characteristics of the cells.

Flow cytometry is described e.g. in Adan et al., Crit Rev Biotechnol. (2017) 37(2):163-176, which is hereby incorporated by reference in its entirety.

Cells can be analysed by flow cytometry in order to evaluate the expression of antigens of interest using target-binding molecules capable of binding to the antigens of interest.

The target-binding molecules may be directly or indirectly labelled with a fluorophore. Fluorophores are reviewed e.g. in Sarkar and Mishra, Applied Spectroscopy Reviews (2018), 53(7):552-601. Fluorophores (sometimes referred to as fluorochromes) are chemical entities that emit light upon excitation. Excitation of a fluorophore with electromagnetic radiation having a wavelength within the absorbance/excitation spectrum of the fluorophore results in the emission of electromagnetic radiation by the fluorophore. Thus cells which have been stained with target-binding molecules capable of binding to an antigen of interest which are in turn labelled with a fluorophore can be analysed for expression of the antigen of interest by excitation of the cells with using a laser emitting light having a wavelength within the absorbance/excitation spectrum of the fluorophore, and detection of light within the emission spectrum of the fluorophore.

Cells can also be stained with fluorescent dyes, and analysed by flow cytometry to evaluate the cells for certain properties. The dyes may e.g. bind to certain molecules/membranes/organelles, and the light emitted from cells following excitation with light within the absorbance/excitation of the cell can provide information in relation to these features. Such dyes are well known in the art, and include e.g. live/dead cell dyes (such as Annexin V, propidium iodide (PI), 7-aminoactinomycin D (AAD-7)), carboxyfluorescein succinimidyl ester (CFSE), dilution of which can be used to infer cell division, tetramethylrhodamine, methyl ester (TMRM) which can be used to infer mitochondrial membrane integrity, amongst others.

In some embodiments, the methods of the present invention involve analysis of cells by flow cytometry in one or more steps of the method. In some embodiments the methods comprise determining whether a cell expresses one or more antigens of interest by analysis by flow cytometry.

In some embodiments the methods employ analysis by flow cytometry to identify cell types/subsets from within the starting heterogeneous population of cells.

In such embodiments cells may be stained with target-binding molecules so as to permit delineation of different types of cells by flow cytometry. The antigens of interest for which the target-binding molecules are specific may be cell type markers.

By way of illustration, in Example 1 herein PBMCs are delineated into immune cell types/subsets based on analysis of the cells for surface expression of CD45, CD19, CD3, CD4, CD8 and CD56. CD8+ T cells are identified as CD45+CD19− CD3+CD8+ cells, CD4+ T cells are identified as CD45+CD19− CD3+CD4+ cells, NK cells are identified as CD45+CD19− CD3− CD56+ cells, and myeloid cells are identified as CD45+CD19− CD3− CD56− cells.

By way of further illustration, in Example 3 herein PBMCs are delineated into immune cell types/subsets based on analysis of the cells for surface expression of αβTCR, γδTCR, MHC Class II, CD66a/c/e and CD7. αβTCR-expressing cells are identified as αβTCR+ cells, γδTCR-expressing cells, innate lymphoid cells and NK cells are identified as αβTCR−, CD66a/c/e−, MHC Class II−, γδTCR+, CD7+ cells, and myeloid cells, basophils, B cells and hematopoietic stem cells are identified as αβTCR−, TCRγδ−, CD7− cells.

Cell Sorting

In some embodiments the methods of the present invention comprise cell sorting. As used herein, 'cell sorting' refers to the separation or partitioning of cells having non-identical phenotypes based on one or more differentiating characteristics.

In particular, embodiments of the methods of the present invention comprise sorting heterogeneous populations of cells into two or more cell types based on expression (e.g. expression/lack of expression/level of expression) of one of more cell type markers.

Methods for cell sorting are well known in the art, and are described e.g. in Tomlinson et al. J Tissue Eng. (2013) 4:2041731412472690, which is hereby incorporated by reference in its entirety. Methods include e.g. fluorescence activated cell sorting (FACS) and magnetic activated cell sorting (MACS), based on the expression of cell type markers. Other methods for cell sorting include e.g. cell sorting by centrifugation or filtration (based on characteristics such as cell size and density), cell sorting based on adhesion properties (e.g. ability to adhere to given surface), and microfluidic cell sorting (reviewed e.g. in Shields et al., Lab Chip (2015) 7; 15(5):1230-49, which is hereby incorporated by reference in its entirety).

In some embodiments of the methods of the present invention, cells are sorted into two or more cell types by fluorescence activated cell sorting (FACS), centrifugation, filtration, differential adhesion or microfluidic cell sorting.

In embodiments the methods of the present invention employ FACS. FACS involves analysis of cells by flow cytometry as described hereinabove, and physical separation of cells based on the results of the cytometric analysis. Separation is achieved by electrically charging the fluid in which the cells are suspended as they are analysed, and the use of charged deflector plates to separate cells into collection tubes (see e.g. FIG. 4 of Tomlinson et al. supra, and the accompanying description).

By way of illustration, in Example 1 herein PBMCs are sorted into immune cell types/subsets based on analysis of the cells for surface expression of CD45, CD19, CD3, CD4, CD8 and CD56 by FACS. CD8+ T cells are identified as CD45+CD19− CD3+CD8+ cells, CD4+ T cells are identified as CD45+CD19− CD3+CD4+ cells, NK cells are identified as CD45+CD19− CD3− CD56+ cells, and myeloid cells are identified as CD45+CD19− CD3− CD56− cells.

By way of further illustration, in Example 3 herein PBMCs are sorted into immune cell types/subsets based on analysis of the cells for surface expression of αβTCR, γδTCR, MHC Class II, CD66a/c/e and CD7. αβTCR-expressing cells are identified as αβTCR+ cells, γδTCR-expressing cells, innate lymphoid cells and NK cells are identified as αβTCR−, CD66a/c/e−, MHC Class II−, γδTCR+, CD7+ cells, and myeloid cells, basophils, B cells and hematopoietic stem cells are identified as αβTCR−, TCRγδ−, CD7− cells.

Mass Cytometry

Mass cytometry is reviewed e.g. in Tanner et al., Cancer Immunol Immunother (2013) 62:955-965 and Spitzer and Nolan Cell, (2016) 165(4):780-91, both of which are hereby incorporated by reference in their entirety. Mass cytometry brings together elements of flow cytometry and elemental mass spectrometry techniques.

Mass cytometry employs stable elemental metal isotopes as tags in the same manner that fluorophores are used in flow cytometry. Such tags are described e.g. in Lou et al., Angew. Chem. Int. Ed. Engl. (2007) 46:6111-6114 and Ornatsky et al., Anal. Chem. (2008), 80: 2539-2547, both of which are hereby incorporated by reference in their entirety.

Cells stained with target-binding molecules directly or indirectly labelled with elemental isotopes nebulised, and then vaporised and atomised. The resulting ion cloud is passed through a quadrupole to discard common biological elements, enriching for heavy-metal reporter ions, which are then separated based on their mass-to-charge ratio in a time-of-flight mass spectrometer. Counts of ions from ion clouds from single cells are converted to electrical signals.

The methods of the present invention generally involve analysis of cells by mass cytometry. Analysis by mass cytometry employs a mass cytometer (e.g. a Helios CyTOF® system), and comprises analysis of the data acquired using appropriate software (e.g. FlowJo software).

In some embodiments the methods comprise determining whether a cell expresses one or more antigens of interest by analysis by mass cytometry.

By way of illustration, in Example 1 herein, T cells within a population of PBMCs are analysed by mass cytometry for expression of CD4, CD8, VD2, CD57, CD27, CCR5, CCR7, CD69 and KLRG-1, and B cells within a population of PBMCs are analysed by mass cytometry for expression of CD40, IgD, IgG, CD24, CD38 and CXCR5.

By way of illustration, in Example 3 herein, αβTCR-expressing cells within a population of PBMCs are analysed by mass cytometry for expression of CD45, CD14/CD19, CD57, TCRαβ, CD103, CD56, Perforin, CD3, CD69, CD8a, CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7 and CD25; γδTCR-expressing cells, innate lymphoid cells and NK cells are analysed by mass cytometry for expression of CD45, CD14/CD19, CD57, CD103, CD56, Perforin, CD3, CD69, CD8a, TCRγδ, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7 and CD25; and myeloid cells, basophils, B cells and hematopoietic stem cells are analysed by mass cytometry for expression of CD45, CD103, CD20, CD5, CD88, CD14, CD45RA, CD34, CD89, IgG, CD38, CD123, ICOS, c-KIT, CD163, CD27, CADM1, IgM, CD301, IgA, IgE, HLA-DR, CXCR5, CHTR2, CCR7 and CD1c.

In some embodiments the methods employ analysis by mass cytometry to identify cell types/subsets from within the starting heterogeneous population of cells.

In such embodiments cells may be stained with target-binding molecules such as to permit delineation of different types of cells by mass cytometry. The antigens of interest for which the target-binding molecules are specific may be cell type markers.

Identifiers

Embodiments of the methods of the present invention comprise labelling cells with identifiers. In some embodiments labelling is of live cells.

In some embodiments the methods comprise labelling one or more cell types with one or more cell type-specific identifiers.

Labelling cell types with one or more cell type-specific identifiers is performed prior to analysing the cells in order to determine expression of the one or more molecules of interest by the one or more cell types of interest. Labelling of cell types with one or more cell type-specific identifiers may be performed at any point prior to analysing the cells in order to determine expression of the one or more molecules of interest by the one or more cell types of interest.

In some embodiments, labelling of cell types with one or more cell type-specific identifiers is performed after sorting cells of the heterogeneous population of cells into two or more cell types based on expression of one or more cell type markers by the cells. In some embodiments, labelling of cell types with one or more cell type-specific identifiers is performed prior to labelling the cells with target-binding molecules capable of binding to one or more molecules of interest. In some embodiments, labelling of cell types with one or more cell type-specific identifiers is performed after labelling the cells with target-binding molecules capable of binding to one or more molecules of interest.

In some embodiments the methods comprise labelling one or more heterogeneous populations of cells with one or more heterogeneous cell population-specific identifiers (which may also be referred to herein as 'population-specific identifiers'). In some embodiments a population-specific identifier may serve as an identifier for heterogeneous cell population from a particular sample; in such embodiments, a population-specific identifier may be referred to as a 'sample-specific identifier'.

The different heterogeneous cell populations may e.g. have been obtained from different sources (e.g. from different donors, or different samples), and/or may have been subjected to different treatments. By way of illustration, in Example 1 herein PMA/ionomycin-stimulated PBMCs are labelled with a sample-specific identifier comprising Pd104 and Pd108, and unstimulated PBMCs are labelled with a sample-specific identifier comprising Pd102 and Pd106. By way of further illustration, in Example 5 herein different samples of PBMCs are stained with anti-CD45 antibodies labelled with different elemental isotope tags (i.e. Cd106, Cd108, Cd110, Cd111, Cd112, Cd113, Cd114, Cd116), permitting cells from the two samples of PBMCs to be distinguished.

An "identifier" can be any detectable agent capable of serving to distinguish cells labelled with the identifier from cells which are not labelled with the identifier (e.g. cells not labelled with an identifier, or cells labelled with a non-identical identifier). Identifiers may also be referred to as "barcodes", and labelling of cells with identifiers may be referred to as "barcoding". Labelling of live cells with cell- or population-specific identifiers is sometimes referred to in the art as 'live cell barcoding'.

An identifier may comprise or consist of a detectable moiety. In some embodiments the detectable moiety is a luminescent, immuno-detectable, radio, chemical, nucleic acid or enzymatic label, or a His, (e.g. 6×His), Myc, GST, MBP, FLAG, HA, E, or Biotin tag. Identifiers contemplated in accordance with the methods of the present invention include e.g. target-binding molecules labelled with a detectable moiety, chelates of elemental isotopes, dyes, etc.

Labelling of cells with cell- or population-specific identifiers (i.e. cell barcoding) is described e.g. in Akkaya et al., J Immunol (2016) 197:2027-2038, Krutzik et al., Curr Protoc Cytom. (2011) CHAPTER: Unit-6.31 and Zunder et al., Nat Protoc. (2015) 10(2): 316-333, which are hereby incorporated by reference in their entirety.

In some embodiments labelling cells with an identifier comprises mass-tag cell barcoding. In some embodiments, labelling cells with an identifier employs a cell-reactive metal chelate. In some embodiments, a cell-reactive metal chelate may comprise a metal-chelating polymer. In some embodiments, a cell-reactive metal chelate may be a complex of maleimido-monoamide-DOTA (m-DOTA), m-EDTA or m-DTPA and an elemental metal isotope.

In some embodiments labelling cells with an identifier comprises fluorescent cell barcoding. In some embodiments, labelling cells with an identifier employs a cell-reactive fluorophore (a fluorescent cell dye).

In the context of embodiments of the methods of the present invention, cell type-specific identifiers are selected so as to permit cell types of interest to be distinguished from other cell types from within the heterogeneous population of cells.

In the context of embodiments of the methods of the present invention, heterogeneous cell population-specific identifiers are selected so as to permit different heterogeneous populations of cells (e.g. heterogeneous populations from different samples) to be distinguished from one another.

Identifiers are selected as appropriate to the analytical techniques employed in the method. It will be appreciated that identifiers are also selected so as to enable expression of one or more molecules of interest by the one or more cell types of interest to be determined.

In some embodiments an identifier is a target-binding molecule directly or indirectly labelled with a detectable moiety (e.g. a detectable moiety as described hereinabove). In particular embodiments, identifiers employed in methods of the present invention are target-binding molecules labelled with an elemental isotope.

By way of illustration, in Example 1 herein sorted CD8+ T cells (i.e. the cells of population 1) are labelled with target-binding molecules capable of identifying CD45 and labelled with an elemental isotope, whereas the sorted cells of CD4+ T cells, NK cells, and myeloid cells (populations 2, 3 and 4) are stained with the same CD45 target-binding molecules conjugated to non-identical elemental isotopes. Thus the non-identical detectable moieties linked to the CD45 target-binding molecule serve as cell-type specific identifiers for population 1, 2, 3, and 4.

In some embodiments different cell types are labelled with cell type-specific identifiers comprising non-identical detectable moieties. In this way, cells of the different cell types can be identified by detection of the respective detectable moieties.

By way of illustration, in Example 3 herein sorted αβTCR-expressing cells (i.e. the cells of population 1) are labelled with target-binding molecules capable of identifying αβTCR-expressing cells, whereas the cells of populations 2 and 3 are not stained with such target-binding molecules. Thus the target-binding molecules capable of identifying αβTCR-expressing cells serve as cell-type specific identifiers for population 1. Similarly, sorted γδTCR-expressing cells, innate lymphoid cells and NK cells (i.e. the cells of population 2) are labelled with target-binding molecules capable of identifying γδTCR-expressing cells, whereas the cells of populations 1 and 3 are not stained with such target-binding molecules. Thus the target-binding molecules capable of identifying γδTCR-expressing cells serve as cell-type specific identifiers for population 2.

It will be appreciated that in some embodiments, labelling the sorted cell types with one or more cell type-specific identifiers and labelling the cells with target-binding molecules capable of binding to one or more molecules of interest are performed simultaneously. By way of illustration, in Example 3 herein, sorted αβTCR-expressing cells (i.e. the cells of population 1) are labelled with target-binding molecules capable of identifying γδTCR-expressing cells at the same time as being labelled with target-binding molecules capable of binding to molecules of interest (e.g. CD45, CD14, CD19, CD57, CD103, CD56, Perforin, CD3, CD69, CD8a, CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7 and CD25). Similarly, sorted γδTCR-expressing cells, innate lymphoid cells and NK cells (i.e. the cells of population 2) are labelled with target-binding molecules capable of identifying γδTCR-expressing cells at the same time as being labelled with target-binding molecules capable of binding to molecules of interest (e.g. CD45, CD14, CD19, CD57, CD103, CD56, Perforin, CD3, CD69, CD8a, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7 and CD25).

It will also be appreciated that in some embodiments, the target for a cell type-specific identifier is also a molecule of interest. By way of illustration, in Example 3 herein, target-binding molecules capable of identifying αβTCR-expressing cells serve as cell-type specific identifiers for population 1, and are also useful for determining e.g. the level of expression of αβTCR by cells of the population. Similarly, target-binding molecules capable of identifying γδTCR-expressing cells serve as cell-type specific identifiers for population 2, and are also useful for determining e.g. the level of expression of γδTCR by cells of the population.

In some embodiments different cell types are labelled with cell type-specific identifiers which comprise target-binding molecules which bind to the same antigen, but which comprise non-identical detectable moieties.

By way of illustration, in Example 1 herein FACS-sorted populations of myeloid cells, NK cells, T cells and B cells are stained with anti-CD45 antibodies labelled with different elemental isotope tags. The different labelled anti-CD45 antibodies are thus used as cell-type specific identifiers, which can be used to distinguish between the different cell types in subsequent analysis by mass cytometry.

The methods of the present invention involve labelling the cell types with cell type-specific identifiers. In some embodiments the methods comprise labelling heterogeneous populations of cells with population-specific identifiers.

In particular embodiments, labelling the cell types/heterogeneous populations of cells employs target-binding molecules which are directly or indirectly labelled with an elemental isotope tag. In such embodiments, analysis of the cells comprises analysis by mass cytometry.

In particular embodiments, labelling the cell types/heterogeneous populations of cells employs target-binding molecules which are directly or indirectly labelled with a fluorophore. In such embodiments, analysis of the cells comprises analysis by flow cytometry.

Cells of different types may be analysed at the same time, and information relating to the different cell types may be deconvoluted using the cell type specific identifiers.

In some embodiments, the methods further comprise labelling cells of the heterogeneous population of cells with one or more population-specific identifiers. Cells may be labelled with population-specific identifiers after a cell sorting step (i.e. labelling may be of sorted cells derived from the starting heterogeneous cell population). The cells may be labelled with population-specific identifiers prior to analysis, in order to determine expression of the one or more molecules of interest by the one or more cell types of interest.

In such embodiments, population-specific identifiers are selected such as to permit cells from different heterogeneous populations of cells to be distinguished. Population-specific identifiers may be used in embodiments of the methods where more than one heterogeneous population of cells is evaluated in accordance with the method of the invention simultaneously. Cells of different populations may be analysed at the same time, and information relating to the different populations may be deconvoluted using the population-specific identifiers.

In some embodiments, an identifier comprises more than one detectable agent. In some embodiments, an identifier comprises a combination of detectable agents.

By way of illustration, in Example 1 herein PMA/ionomycin-stimulated PBMCs are labelled with a sample-specific identifier comprising Pd104 and Pd108, and unstimulated PBMCs are labelled with a sample-specific identifier comprising Pd102 and Pd106. By way of further illustration, in Example 5 herein different samples of PBMCs are stained with anti-CD45 antibodies labelled with different elemental isotope tags (i.e. Cd106, Cd110).

Buffer Cells

In some embodiments the methods comprise mixing cells of the heterogeneous population of cells which are the subject of the analysis with buffer cells. Cells may be mixed with buffer cells after a cell sorting step (i.e. buffer cells may be mixed with sorted cells derived from the starting heterogeneous cell population).

In the present disclosure "buffer cells" are cells which are of no analytical interest in the context of the method, which are used to "buffer" the cells of the heterogeneous population of cells from being lost in the course of sample preparation, processing and/or analysis. In this way, fewer cells of analytical interest are lost.

In particular, the buffer cells are used to minimise loss of cells of the heterogeneous population of cells (i.e. the cells of analytical interest) during e.g. cell staining and washing steps. Buffer cells may be used e.g. to increase the number of cells in a given sample to be processed to a number which can be readily processed in accordance with the analytical techniques employed in the method of the invention.

Buffer cells can be cells of any type/origin, provided that they can be distinguished from the cells of analytical interest in the analysis, or separated from the cells of analytical interest prior to analysis.

In some embodiments, the methods further comprise separating buffer cells from cells of the heterogeneous population of cells. That is, in some embodiments buffer cells are removed from samples, e.g. prior to analysis.

Buffer cells may be removed e.g. via positive/negative selection. Such methods include immunomagnetic separation techniques, including e.g. separation using immunomagnetic beads (i.e. MACS).

In some embodiments buffer cells may be removed using an agent which is capable of binding to a molecule which is expressed by the buffer cells, but not by cells of analytical interest. By way of illustration, exemplary buffer cells that may be used in accordance with the methods of the present invention include e.g. murine TK1 cells, which may be separated from human cells of analytical interest by immunomagnetic separation using magnetic beads conjugated to antibody specific for mouse CD8.

In some embodiments buffer cells may be labelled in order to facilitate their easy separation from a sample containing buffer cells and cells of the heterogeneous population of cells, e.g. prior to their being mixed with the cells of the heterogeneous population of cells (i.e. the cells of analytical interest). By way of illustration, exemplary buffer cells that may be used in accordance with the methods of the present invention include e.g. PBMCs which are labelled with magnetic beads conjugated to antibody specific for CD45, prior to their being mixed with cells of the heterogeneous population of cells. The buffer cells may then be separated from the cells of analytical interest by immunomagnetic separation.

Heterogeneous Populations of Cells

The methods of the present invention are concerned with the characterisation of populations of cells, and in particular of cell types of interest within heterogeneous populations of cells. The present invention can be applied to the analysis of cells within any heterogeneous cell population(s) of interest.

As referred to herein a "heterogeneous population of cells" refers to a population of cells comprising more than one kind of cell. By way of illustration, a population of PBMCs is a heterogeneous population of cells comprising e.g. T cells, NK cells, B cells and myeloid cells. By way of further illustration, populations of T cells may be heterogeneous populations comprising e.g. CD4+ T cells and CD8+ T cells.

Herein, reference to "cells of the population heterogeneous population of cells" refers to cells derived from a reference heterogeneous population of cells, and may be used to refer to cells derived from the reference heterogeneous population of cells after e.g. cell sorting and/or labelling steps according to the methods of the present invention.

In some embodiments, a heterogeneous population of cells in accordance with the present invention is selected from: a population of cells of hematopoietic origin, blood cells, leukocytes, peripheral blood mononuclear cells (PBMCs), lymphocytes, neutrophils, eosinophils, basophils, dendritic cells, lymphocytes, monocytes, T cells, B cells, NK cells, NKT cells and innate lymphoid cells (ILCs).

In some embodiments, the heterogeneous population of cells may be cells of a given fluid, organ or tissue. In some embodiments, the heterogeneous population of cells may be cells of a cancer (e.g. cells of a tumor). In some embodiments, the heterogeneous population of cells may be cells of a sample obtained from a given fluid, organ, tissue or cancer (e.g. tumor).

In some embodiments the heterogeneous population of cells may be immune cells of a sample obtained from a given fluid, organ, tissue or cancer (e.g. tumor). In some embodiments, the heterogeneous population of cells may be tumor-infiltrating immune cells, e.g. tumor-infiltrating lymphocytes (TILs).

In some embodiments the heterogeneous population of cells has been subjected to a specified condition/treatment prior to evaluation in the method of the invention. In some embodiments the heterogeneous population of cells has been obtained at a specified time point in the course of a particular condition/treatment. The method may be employed to evaluate the effect of the condition/treatment.

By way of illustration, in Example 1 herein a population of PBMCs is stimulated with PMA and ionomycin prior to evaluation in the method of the invention.

Cell Type Markers and Cell Types

Embodiments of the methods of present invention comprise evaluating populations of cells for expression of cell type markers, and/or assigning cell types based on expression of cell type markers. Cell types/subsets of interest are typically assigned, and the cells sorted into cells of the same type based on analysis of the cells for the presence/absence/level of expression of one or more cell type markers.

A "cell type marker" as used herein refers to any factor that alone or in combination with one or more other cell type markers can be used to identify (i.e. detect the presence of) a given cell type and/or cell subset within a heterogeneous population of cells. Cell types/subsets may be identified based on determination of expression or lack of expression of one or more cell type markers, and/or the level of expression of one or more cell type markers. Cell type markers include correlates of a particular cell state, phenotype and/or viability.

In some embodiments, a cell type marker may be expressed in or at the cell surface of a cell expressing the cell type marker.

In some embodiments a cell type marker is an immune cell molecule. In some embodiments a cell type marker is an immune cell surface molecule. In some embodiments a cell type marker is a cluster of differentiation (CD). In some embodiments a cell type marker is an immune cell receptor. In some embodiments a cell type marker is an immune cell ligand. In some embodiments a cell type marker is a cell signalling molecule, e.g. a cytokine, chemokine, interferon, interleukin or lymphokine. In some embodiments a cell type marker is a transcription factor.

In some embodiments a cell type marker is a marker associated with a disease/disorder. In some embodiments a cell type marker is a cancer cell antigen (e.g. an antigen which is expressed or over-expressed by a cancer cell). In some embodiments a cell type marker is an antigen whose expression is associated with infection by an infectious agent (e.g. an antigen which is expressed or over-expressed by a cell infected with an infectious agent, or which is expressed or over-expressed by a cell in response to an infectious agent). In some embodiments a cell type marker is an autoantigen.

In some embodiments a cell type marker is a marker whose expression is associated with an immune response to a cancer or infection by an infectious agent. In some embodiments a cell type marker is a marker whose expression is associated with an autoimmune response. In some embodiments a cell type marker is a T cell receptor (TCR) having a specificity of interest, e.g. a TCR specific for a peptide:MHC complex of interest.

The cell types and cell subsets that may be delineated from within heterogeneous populations of cells by analysis for expression of cell type marker(s) in accordance with the methods of the present invention will of course depend on the heterogeneous population of cells.

By way of illustration, in Example 1 herein, CD8+ T cell, CD4+ T cell, NK cell and myeloid cell types are identified from within a population of PBMCs based on analysis of the cells for surface expression of CD45, CD19, CD3, CD4, CD8 and CD56. By way of further illustration, in Example 3 herein, (1) αβTCR– expressing cells, (2) γδTCR-expressing cells/innate lymphoid cells/NK cells and (3) myeloid cells/basophils/B cells/hematopoietic stem cells are identified within a population of PBMCs based on analysis of the cells for surface expression of αβTCR, γδTCR, MHC Class II, CD66a/c/e and CD7.

Cell type markers are well known in the art. Combinations of cell type markers can be selected as appropriate to the cell type(s)/subset(s) of interest. In some embodiments, a cell type marker in accordance with the present invention is selected from an antigen identified in Immune Cell Guide, Invitrogen (ThermoFisher Scientific), (2017), COL31450 0417 (hereby incorporated by reference in its entirety). In some embodiments, a cell type/subset in accordance with the present invention is selected from a cell type/subset identified in Immune Cell Guide, Invitrogen (ThermoFisher Scientific), (2017), COL31450 0417.

In some embodiments, a cell type marker is a molecule which is expressed by a cell type of interest to be identified within a heterogeneous population of cells. Such cell type markers are useful for the positive identification of a cell type of interest based on detection of the cell type marker. For example, αβTCR-expressing T cells may be identified within a heterogeneous population of cells based on detection of αβTCR.

In some embodiments, a cell type marker is a molecule which is not expressed by a cell type of interest to be identified within a heterogeneous population of cells. In some embodiments, a cell type marker is a molecule which is expressed by a cell type other than the cell type of interest to be identified within a heterogeneous population of cells. Such cell type markers are useful for the identification of a cell type of interest based on exclusion of cells expressing the cell type marker, and/or for the identification of cells other than the cell type of interest. For example, αβTCR-expressing T cells may be identified based on lack of expression of CD19, which may be used to identify B cells.

In some embodiments, a cell type marker is a molecule expressed by a cell type shown in FIG. 6A or 6B. In some embodiments, a cell type marker is selected from: a molecule expressed by T cells (e.g. αβ T cells, CD4+ T cells (e.g. naïve CD4+ T cells, Th1 cells, Th2 cells, Th17 cells, Tfh cells, and/or Tregs), CD8+ T cells (e.g. naïve CD8+ T cells, CD8+ effector T cells, exhausted CD8+ T cells, and/or senescent CD8+ T cells), γδ T cells (e.g. Vδ1 cells and/or Vδ2 cells), and/or MAIT cells); a molecule expressed by B cells (e.g. immature B cells, naïve B cells, non-switched memory B cells, switched memory B cells and/or plasma B cells); a molecule expressed by NK cells (e.g. $CD56^{med}$ NK cells and/or $CD56^{bright}$ NK cells); a molecule expressed by innate lymphoid cells (e.g. ILC2 cells and/or ILC3 cells); a molecule expressed by monocytes (e.g. classical monocytes, intermediate monocytes and/or non-classical monocytes); a molecule expressed by dendritic cells (e.g. cDC1 cells, cDC2 cells and/or pDCs); a molecule expressed by basophils; and a molecule expressed by hematopoietic stem cells.

In some embodiments, a cell type marker is selected from a cell type marker shown in the Table of Example 1. In some embodiments, a cell type marker is selected from a molecule listed in Example 3. In some embodiments, a cell type marker is selected from a molecule shown in FIG. 6B. In some embodiments, a cell type marker is selected from CD45, CD14, CD19, CD57, TCRα, TCRβ, CD103, CD56, Perforin, CD3, CD69, CD8 (e.g. CD8a), CD4, CD45RO, CCR4, Granzyme B, CD38, KLRG1, ICOS, TIGIT, Granzyme K, CD27, CXCR3, PD-1, TIM3, CD161, CD127, MHC Class II (e.g. HLA-DR), CXCR5, CHTR2, CCR7, CD25, CD103, TCRγ, TCRδ, CD34, NKG2C, c-KIT, Vd1, Vd2, NKp44, CD20, CD5, CD88, CD45RA, CD89, IgG, CD123, CD163, CADM1, IgM, CD301, IgA, IgE, CCR7, CD1c, CLA, CX3CR1, CD71, CD39, CD94, CD16, Granzyme A, CD80, CD86, CD15, CD68, CD31, IgD, CD66a/c/e, CXCR4, CD49a, CD13, OX40, CD38, CD64, CD122, FcER1, IL-18R, CD1d, Tbet, CD33, IL-10, CD123, CD10, CD162, CD303, CD107a, CD22, NKp44, CD169, CD43, CD172a, Ki67, CD95, GM-CSF, IL-10Ra, CD141, ITGB7, CD40, CCR5, NK-46p, CXCR1, IL-6, GATA3, CD26, CD11b, CCR2, CD24, 2B4, CD49d, Va7.2, CD21, Va7.2, NKp30, CD28, CD206, CCR6, CD11c and FcRL4.

In some embodiments, a cell type marker is a molecule permitting identification of a γδ T cells from within a population of PBMCs. In some embodiments, a cell type marker is a molecule permitting identification a cell type other than a γδ T cells from within a population of PBMCs. In some embodiments, a cell type marker is a molecule expressed by a γδ T cells. In some embodiments, a cell type marker is selected from CD45, CD14, CD19, CD57, TCRα, TCRβ, CD103, CD56, Perforin, CD3, CD69, CD8 (e.g. CD8a), CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7, CD25, CLA, CX3CR1, CD71 and CD39.

In some embodiments, a cell type marker is a molecule permitting identification of γδ T cells, innate lymphoid cells and/or NK cells from within a population of PBMCs. In some embodiments, a cell type marker is a molecule permitting identification a cell type other than γδ T cells, innate lymphoid cells and/or NK cells from within a population of PBMCs. In some embodiments, a cell type marker is a molecule expressed by γδ T cells, innate lymphoid cells and/or NK cells. In some embodiments, a cell type marker is selected from CD45, CD14, CD19, CD57, CD103, CD56, Perforin, CD3, CD69, CD8 (e.g. CD8a), TCRγ, TCRδ, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7, CD25, CD94, CD16 and Granzyme A.

In some embodiments, a cell type marker is a molecule permitting identification of myeloid cells, basophils, B cells and/or hematopoietic stem cells from within a population of PBMCs. In some embodiments, a cell type marker is a molecule permitting identification a cell type other than myeloid cells, basophils, B cells and/or hematopoietic stem cells from within a population of PBMCs. In some embodiments, a cell type marker is a molecule expressed by myeloid cells, basophils, B cells and/or hematopoietic stem cells. In some embodiments, a cell type marker is selected from CD45, CD103, CD20, CD5, CD88, CD14, CD45RA, CD34, CD89, IgG, CD38, CD123, ICOS, c-KIT, CD163, CD27, CADM1, IgM, CD301, IgA, IgE, HLA-DR, CXCR5, CHTR2, CCR7, CD1c, CD80 and CD86.

In some embodiments, the methods comprise labelling cells with target-binding molecules capable of binding to a cell type marker. In some embodiments the target-binding molecules are labelled with a detectable moiety, such as a fluorophore or an elemental isotope tag.

In particular embodiments, target-binding molecules capable of binding to a cell type marker are directly or indirectly labelled with an elemental isotope tag. In such embodiments, analysis of the cells comprises analysis by mass cytometry. In particular embodiments, target-binding molecules capable of binding to a cell type marker are directly or indirectly labelled with a fluorophore. In such embodiments, analysis of the cells comprises analysis by flow cytometry.

It will be appreciated that target-binding molecules employed for the detection of different cell type markers are provided with non-identical detectable moieties. By way of illustration, with reference to the table of Example 1 herein, different metal tags are employed for different cell type markers in any given panel.

Embodiments of the methods of present invention comprise assigning two or more cell types within a heterogeneous population of cells. In some embodiments, "two or more cell types" is one of 2, 3, 4, 5, 6, 7, 8, 9, or 10 cell types. In some embodiments, "two or more cell types" is one of 2-4, 2-6, 2-8 or 2-10 cell types.

In some embodiments cells within a heterogeneous population of cells are assigned to two or more cell types based on the expression of one or more cell type markers. In some embodiments, "one or more cell type markers" is one of 1-5, 1-10, 1-15, 1-20, 1-25, 1-30, 5-10, 5-15, 5-20, 5-25, 5-30, 10-15, 10-20, 10-25, 10-30, 15-20, 15-25, 15-30, 20-25, 20-30, or 25-30 cell type markers.

The methods of the present invention involve identifying and/or sorting cells of a heterogeneous population of cells into two or more cell types based on expression (i.e. the presence/absence/level of expression) of the one or more cell type markers by the cells.

In particular embodiments, identification and/or sorting cells employs target-binding molecules capable of binding to the one or more molecules of interest, which are directly or indirectly labelled with a fluorophore tag. In such embodiments, analysis of the expression of one or more molecules of interest comprises analysis by flow cytometry and/or fluorescence activated cell sorting (FACS).

Molecules of Interest

In the present invention, cells of a heterogeneous population of cells are evaluated for one or more molecules of interest. A "molecule of interest" as used herein refers to any molecule which is it is desirable to detect or measure. A molecule of interest may be a target (i.e. a target molecule) for a target-binding molecule.

A molecule of interest may a biomolecule (i.e. a molecule produced by a biological organism). A molecule of interest may e.g. be a protein (e.g. polypeptide/peptide), glycoprotein, lipoprotein, nucleic acid (e.g. a polynucleotide/oligonucleotide), sugar, lipid (fatty acid, glyceride) phospholipid, glycolipid, etc.

In some embodiments, cells are evaluated to determine expression or lack of expression of one or more molecules of interest, and/or the level of expression of one or more molecules of interest. The methods comprise labelling cells with target-binding molecules capable of binding to one or more molecules of interest.

In some embodiments, a molecule of interest is a correlate of a property/activity of interest. In some embodiments, cells are evaluated to determine the presence/absence/the level of a given property/activity.

In some embodiments a molecule of interest in accordance with the present invention is a cell type marker as described herein.

In some embodiments, a molecule of interest is a molecule expressed by a cell type shown in FIG. 6A or 6B. In some embodiments, a molecule of interest is selected from: a molecule expressed by T cells (e.g. a γδ T cells, CD4+ T cells (e.g. naïve CD4+ T cells, Th1 cells, Th2 cells, Th17 cells, Tfh cells, and/or Tregs), CD8+ T cells (e.g. naïve CD8+ T cells, CD8+ effector T cells, exhausted CD8+ T cells, and/or senescent CD8+ T cells), γδ T cells (e.g. Vδ1 cells and/or Vθ2 cells), and/or MAIT cells); a molecule expressed by B cells (e.g. immature B cells, naïve B cells, non-switched memory B cells, switched memory B cells and/or plasma B cells); a molecule expressed by NK cells (e.g. CD56$^{med}$ NK cells and/or CD56$^{bright}$ NK cells); a molecule expressed by innate lymphoid cells (e.g. ILC2 cells and/or ILC3 cells); a molecule expressed by monocytes (e.g. classical monocytes, intermediate monocytes and/or non-classical monocytes); a molecule expressed by dendritic cells (e.g. cDC1 cells, cDC2 cells and/or pDCs); a molecule expressed by basophils; and a molecule expressed by hematopoietic stem cells.

In some embodiments, a molecule of interest is selected from a molecule shown in the Table of Example 1. In some embodiments, a molecule of interest is selected from a molecule listed in Example 3. In some embodiments, a molecule of interest is selected from a molecule shown in FIG. 6B.

In some embodiments, a cell type marker is selected from CD45, CD14, CD19, CD57, TCRα, TCRβ, CD103, CD56, Perforin, CD3, CD69, CD8 (e.g. CD8a), CD4, CD45RO, CCR4, Granzyme B, CD38, KLRG1, ICOS, TIGIT, Granzyme K, CD27, CXCR3, PD-1, TIM3, CD161, CD127, MHC Class II (e.g. HLA-DR), CXCR5, CHTR2, CCR7, CD25, CD103, TCRγ, TCRδ, CD34, NKG2C, c-KIT, Vd1, Vd2, NKp44, CD20, CD5, CD88, CD45RA, CD89, IgG, CD123, CD163, CADM1, IgM, CD301, IgA, IgE, CCR7, CD1c, CLA, CX3CR1, CD71, CD39, CD94, CD16, Granzyme A, CD80, CD86, CD15, CD68, CD31, IgD, CD66a/c/e, CXCR4, CD49a, CD13, OX40, CD38, CD64, CD122, FcER1, IL-18R, CD1d, Tbet, CD33, IL-10, CD123, CD10, CD162, CD303, CD107a, CD22, NKp44, CD169, CD43, CD172a, Ki67, CD95, GM-CSF, IL-10Ra, CD141, ITGB7, CD40, CCR5, NK-46p, CXCR1, IL-6, GATA3, CD26, CD11b, CCR2, CD24, 2B4, CD49d, Va7.2, CD21, Va7.2, NKp30, CD28, CD206, CCR6, CD11c and FcRL4.

In some embodiments, a molecule of interest is selected from CD45, CD14, CD19, CD57, TCRα, TCRβ, CD103, CD56, Perforin, CD3, CD69, CD8 (e.g. CD8a), CD4, CD45RO, CCR4, Granzyme B, CD38, KLRG1, ICOS, TIGIT, Granzyme K, CD27, CXCR3, PD-1, TIM3, CD161, CD127, MHC Class II (e.g. HLA-DR), CXCR5, CHTR2, CCR7, CD25, CD103, TCRγ, TCRδ, CD34, NKG2C, c-KIT, Vd1, Vd2, NKp44, CD20, CD5, CD88, CD45RA, CD89, IgG, CD123, CD163, CADM1, IgM, CD301, IgA, IgE, CCR7, CD1c, CLA, CX3CR1, CD71, CD39, CD94, CD16, Granzyme A, CD80 and CD86.

In some embodiments, a molecule of interest is a molecule permitting identification of a γδ T cells from within a population of PBMCs. In some embodiments, a molecule of interest is a molecule permitting identification a cell type other than a γδ T cells from within a population of PBMCs. In some embodiments, molecule of interest is a molecule expressed by a γδ T cells. In some embodiments, a molecule of interest is selected from CD45, CD14, CD19, CD57, TCRα, TCRβ, CD103, CD56, Perforin, CD3, CD69, CD8 (e.g. CD8a), CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7, CD25, CLA, CX3CR1, CD71 and CD39.

In some embodiments, a molecule of interest is a molecule permitting identification of γδ T cells, innate lymphoid cells and/or NK cells from within a population of PBMCs. In some embodiments, a molecule of interest is a molecule permitting identification a cell type other than γδ T cells, innate lymphoid cells and/or NK cells from within a population of PBMCs. In some embodiments, molecule of interest is a molecule expressed by γδ T cells, innate lymphoid cells and/or NK cells. In some embodiments, a molecule of interest is selected from CD45, CD14, CD19, CD57, CD103, CD56, Perforin, CD3, CD69, CD8 (e.g. CD8a), TCRγ, TCRδ, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7, CD25, CD94, CD16 and Granzyme A.

In some embodiments, a molecule of interest is a molecule permitting identification of myeloid cells, basophils, B cells and/or hematopoietic stem cells from within a population of PBMCs. In some embodiments, a molecule of interest is a molecule permitting identification a cell type other than myeloid cells, basophils, B cells and/or hematopoietic stem cells from within a population of PBMCs. In some embodiments, molecule of interest is a molecule expressed by myeloid cells, basophils, B cells and/or hematopoietic stem cells. In some embodiments, a molecule of interest is selected from CD45, CD103, CD20, CD5, CD88, CD14, CD45RA, CD34, CD89, IgG, CD38, CD123, ICOS, c-KIT, CD163, CD27, CADM1, IgM, CD301, IgA, IgE, HLA-DR, CXCR5, CHTR2, CCR7, CD1c, CD80 and CD86.

By way of illustration, in Example 1 herein T cells from within a population of PBMCs are evaluated for expression of CD57, CD27, CCR5, CCR7, CD69, and KLRG-1, and B cells from within the same population are evaluated for expression of CD40, IgD, IgG, CD24, CD38 and CXCR5. By way of further illustration, in Example 3 herein, αβTCR-expressing cells from within a population of PBMCs are evaluated for expression of CD45, CD14/CD19, CD57, TCRαβ, CD103, CD56, Perforin, CD3, CD69, CD8a, CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7 and CD25, γδTCR-expressing cells/innate lymphoid cells/NK cells within the same population of PBMCs are evaluated for expression of CD45, CD14/CD19, CD57, CD103, CD56, Perforin, CD3, CD69, CD8a, TCRγδ, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7 and CD25; and myeloid cells/basophils/B cells/hematopoietic stem cells within the same population of PBMCs are evaluated for expression of CD45, CD103, CD20, CD5, CD88, CD14, CD45RA, CD34, CD89, IgG, CD38, CD123, ICOS, c-KIT, CD163, CD27, CADM1, IgM, CD301, IgA, IgE, HLA-DR, CXCR5, CHTR2, CCR7 and CD1c.

The methods of the present invention may be used to identify cells having particular activities/properties of interest, as determined by evaluation of the cells for one or more molecules of interest.

In some embodiments, the methods comprise labelling cells with target-binding molecules capable of binding to a molecule of interest. In some embodiments the target-binding molecules are labelled with a detectable moiety, such as a fluorophore or an elemental isotope tag. It will be appreciated that target-binding molecules employed in a method for the detection of different molecules of interest are provided with non-identical detectable moieties.

In some embodiments, the methods comprise labelling cells with target-binding molecules capable of binding to a molecule of interest, wherein the target-binding molecules are directly or indirectly labelled with an elemental isotope tag. In such embodiments, analysis of the cells comprises analysis by mass cytometry. In some embodiments the methods comprise labelling cells with target-binding molecules capable of binding to a molecule of interest, wherein the target-binding molecules are directly or indirectly labelled with a fluorophore. In such embodiments, analysis of the cells comprises analysis by flow cytometry.

In some particular embodiments, the methods comprise labelling cells with target-binding molecules capable of binding to a T cell receptor (TCR) having a specificity of interest. In some embodiments the methods comprise labelling cells with MHC:peptide complexes capable of binding to TCR having a specificity of interest. In some embodiments the MHC:peptide complexes are labelled with an elemental isotope tag.

Embodiments of the methods of present invention comprise analysing cells in order to determine expression of one or more molecules of interest. In some embodiments, "one or more molecules of interest" is one of is one of 1-5, 1-10, 1-15, 1-20, 1-25, 1-30, 5-10, 5-15, 5-20, 5-25, 5-30, 5-35, 5-40, 10-15, 10-20, 10-25, 10-30, 10-35, 10-40, 15-20, 15-25, 15-30, 15-35, 15-40, 20-25, 20-30, 20-35, 20-40, 25-30, 25-35, 25-40, 30-35, 30-40, 35-40, 25-50, 30-50, 35-50, 40-50, 45-50 or more than 50 molecules of interest.

The methods of the present invention involve analysing cells to determine expression (i.e. the presence/absence/level of expression) of the one or more molecules of interest by one or more cell types of interest.

In particular embodiments, analysis of the expression of one or more molecules of interest employs target-binding molecules capable of binding to the one or more molecules of interest, which are directly or indirectly labelled with an elemental isotope tag. In such embodiments, analysis of the expression of one or more molecules of interest comprises analysis by mass cytometry.

In some embodiments, different cell types are labelled with target-binding molecules for analysis of the expression of the same molecules of interest.

In some embodiments, labelling cells with target-binding molecules capable of binding to one or more molecules of interest comprises labelling different sorted cell types with target-binding molecules capable of binding to non-identical molecules of interest. That is, in some embodiments, sorted cell types are labelled with target-binding molecules capable of binding to non-identical combinations of molecules of interest.

In some embodiments, different cell types are labelled with target-binding molecules for analysis of the expression of different molecules of interest. In some embodiments, different cell types are analysed with non-identical combinations of target-binding molecules specific for molecules of interest.

In some embodiments, a first cell type is labelled with target-binding molecules specific for a plurality of molecules of interest, and second cell type is labelled with target-binding molecules specific for a plurality of molecules of interest, wherein the first and second cell types are labelled with target-binding molecules specific for a non-identical plurality of molecules of interest.

For example, a first cell type may be labelled with target-binding molecules specific for molecules A, B, C and D, and a second cell type may be labelled with target-binding molecules specific for molecules E, F, and G.

By way of illustration, in Example 1 herein T cells from within a population of PBMCs are analysed for expression of CD4, CD8, VD2, CD57, CD27, CCR5, CCR7, CD69 and KLRG-1, whereas B cells from within the population of PBMCs are analysed for expression of CD40, IgD, IgG, CD24, CD38 and CXCR5.

In some embodiments, one or more molecules of interest may be analysed in different cell types. That is, there may be molecules of interest in common between the non-identical pluralities of molecules of interest analysed in the different cell types.

For example, a first cell type may be labelled with target-binding molecules specific for molecules A, B, C and D, and a second cell type may be labelled with target-binding molecules specific for molecules C, D, E, F and G. So, the overall plurality of molecules of interest analysed in the different cell types is non-identical (A, B, C and D vs. C, D, E, F and G), but certain molecules of interest are analysed in both cell types (C and D).

By way of illustration, in Example 3 herein, αβTCR-expressing cells from within a population of PBMCs are evaluated for expression of CD45, CD14/CD19, CD57, TCRαβ, CD103, CD56, Perforin, CD3, CD69, CD8a, CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7 and CD25, γδTCR-expressing cells/innate lymphoid cells/NK cells within the same population of PBMCs are evaluated for expression of CD45, CD14/CD19, CD57, CD103, CD56, Perforin, CD3, CD69, CD8a, TCRγδ, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7 and CD25; and myeloid cells/basophils/B cells/hematopoietic stem cells within the same population of PBMCs are evaluated for expression of CD45, CD103, CD20, CD5, CD88, CD14, CD45RA, CD34, CD89, IgG, CD38, CD123, ICOS, c-KIT, CD163, CD27, CADM1, IgM, CD301, IgA, IgE, HLA-DR, CXCR5, CHTR2, CCR7 and CD1c.

In embodiments of the methods wherein more than one cell type is analysed in order to determine expression of the one or more molecules of interest, the analysis of the different cell types may be performed simultaneously. Cells of different types may be analysed at the same time, and expression of the one or more molecules of interest by the different cell types may be deconvoluted using the cell type-specific identifiers.

In embodiments of the methods wherein more than one cell type from different heterogeneous populations of cells is analysed in order to determine expression of the one or more molecules of interest, the analysis of the same cell types from the different heterogeneous populations of cells may be performed simultaneously. Cells from different heterogeneous populations of cells may be analysed at the same time, and expression of the one or more molecules of interest by the cells from different heterogeneous populations may be deconvoluted using the population-specific identifiers.

It will be appreciated that in embodiments of the methods wherein labelling the cells with cell type-specific identifiers or population-specific identifiers employs target-binding molecules which are directly or indirectly labelled with an elemental isotope tag, and wherein labelling the cells with target-binding molecules capable of binding to one or more molecules of interest employs target-binding molecules which are directly or indirectly labelled with an elemental isotope tag, the elemental isotope tags are selected such as to permit analysis of expression of the one or more molecules of interest by the one or more cell types of interest.

Applications of the Methods

The present invention may be used to investigate substantially any heterogeneous population(s) of cells.

The methods of the present invention are useful for detecting and/or quantifying cells expressing/not expressing one or more molecules of interest, and for detecting and/or quantifying expression of one or more molecules of interest by one or more cell types of interest.

In particular, the methods of the present invention are useful for profiling populations of immune cells, which is also referred to as immunoprofiling. The methods of the present invention are advantageously suited to high-throughput, high-resolution immunoprofiling.

The methods may be used to identify/quantify e.g. immune cells having one or more properties of interest.

The methods may be used to identify/quantify cells expressing a molecule of interest, and/or quantify the expression of a molecule of interest by cells. The methods may be used to identify/quantify cells expressing a cell type marker of interest, expressing a cell signalling molecule of interest, and/or displaying a functional property of interest. The methods may be used to identify/quantify immune cells specific for an antigen/peptide thereof of interest. The antigen/peptide thereof may be e.g. of an infectious agent (e.g. a virus), or may be a cancer antigen/peptide thereof.

In some embodiments, the methods comprise analysis of two or more different heterogeneous population of cells.

By way of illustration, Example 1 herein describes the analysis of expression of markers of interest by cell types within a population of PMA/ionomycin-stimulated PBMCs, as compared to an equivalent unstimulated PBMC population. Also, Example 2 herein describes the analysis of expression of markers of interest by cell types within populations of PBMCs obtained from different donors. Furthermore, Example 5 herein describes analysis of (1) αβTCR-expressing cells, (2) γδTCR-expressing cells/innate lymphoid cells/NK cells, and (3) myeloid cells/basophils/B cells/hematopoietic stem cells in different PBMC populations.

The methods are useful for the comparison of heterogeneous populations of cells. The methods are useful to investigate expression of one or more molecules of interest in populations of cells obtained from different sources (e.g. different subjects), subjected to different conditions (e.g. different treatments), and/or at different time points.

The methods may be used for the identification/quantification of cells expressing one or more molecules of interest within heterogeneous populations of cells obtained from different sources (e.g. different subjects), subjected to different conditions (e.g. different treatments), and/or at different time points.

The methods of the present invention may be useful, for example, in methods for:
  analysing the course, development or progression of a disease/condition;
  analysing responses to therapeutic/prophylactic intervention for a disease/condition;
  identifying correlates/markers of disease/condition course/phenotypes/prognoses;
  identifying targets for therapeutic/prophylactic intervention for a disease/condition;
  identifying correlates/markers of responses to therapeutic/prophylactic intervention for a disease/condition;
  identifying correlates/markers of responses to chemical and/or physical stimuli; or
  analysing cellular, tissue and/or organ development and/or function.

The following particular exemplary embodiments of the methods are expressly contemplated in connection with the present invention.

(A) A method for evaluating the expression of one or more molecules of interest by one or more cell types of interest within a population of PBMCs, comprising:
  (i) sorting cells of the population of PBMCs into two or more cell types based on expression of one or more cell type markers by the cells by FACS;
  (ii) labelling the sorted cell types with target-binding molecules capable of binding to one or more molecules of interest, using target-binding molecules conjugated to non-identical elemental isotopes;
  (iii) analysing the cells by mass cytometry in order to determine expression of the one or more molecules of interest by the one or more cell types of interest.

(B) A method for evaluating the expression of one or more molecules of interest by one or more cell types of interest within two or more populations of PBMCs, comprising:
  (i) labelling the cells of one or more of the populations of PBMCs with a population-specific identifier;
  (ii) sorting cells of the population of PBMCs into two or more cell types based on expression of one or more cell type markers by the cells by FACS;
  (iii) labelling the sorted cell types with target-binding molecules capable of binding to one or more molecules of interest, using target-binding molecules conjugated to non-identical elemental isotopes;
  (iv) mixing together the sorted, labelled cells of the same cell type from different populations of PBMCs;
  (v) analysing the cells by mass cytometry in order to determine expression of the one or more molecules of interest by the one or more cell types of interest.

(C) A method for evaluating the expression of one or more molecules of interest by one or more cell types of interest within a population of PBMCs, comprising:
  (i) sorting cells of the population of PBMCs into two or more cell types based on expression of one or more cell type markers by the cells by FACS;
  (ii) labelling the sorted cell types with target-binding molecules capable of binding to one or more molecules of interest, using target-binding molecules conjugated to non-identical elemental isotopes;
  (iii) mixing together the sorted, labelled cells of different cell types;
  (iv) analysing the cells by mass cytometry in order to determine expression of the one or more molecules of interest by the one or more cell types of interest.

(D) A method for evaluating the expression of one or more molecules of interest by one or more cell types of interest within a population of PBMCs, comprising:
  (i) sorting cells of the population of PBMCs into two or more cell types based on expression of one or more cell type markers by the cells by FACS;
  (ii) labelling the sorted cell types with target-binding molecules conjugated to an elemental isotope, wherein the different sorted cell types are labelled with target-binding molecules conjugated to non-identical elemental isotopes;
  (iii) mixing the labelled, sorted cell types with buffer cells, wherein the buffer cells are PBMCs labelled with target-binding molecules conjugated to magnetic beads;
  (iii) labelling the cells with target-binding molecules capable of binding to one or more molecules of interest, using target-binding molecules conjugated to non-identical elemental isotopes;
  (iv) mixing together the sorted, labelled cells of different cell types;
  (v) removing the buffer cells;
  (vi) analysing the cells by mass cytometry in order to determine expression of the one or more molecules of interest by the one or more cell types of interest.

(E) A method for evaluating the expression of one or more molecules of interest by one or more cell types of interest within two or more populations of PBMCs, comprising:

(i) labelling the cells of one or more of the populations of PBMCs with a population-specific identifier;
(ii) sorting cells of the populations of PBMCs into two or more cell types based on expression of one or more cell type markers by the cells by FACS;
(iii) labelling the sorted cell types with target-binding molecules conjugated to an elemental isotope, wherein the different sorted cell types are labelled with target-binding molecules conjugated to non-identical elemental isotopes;
(iv) mixing the labelled, sorted cell types with buffer cells, wherein the buffer cells are PBMCs labelled with target-binding molecules conjugated to magnetic beads;
(v) labelling the cells with target-binding molecules capable of binding to one or more molecules of interest, using target-binding molecules conjugated to non-identical elemental isotopes;
(vi) mixing together the sorted, labelled cells of different cell types;
(vii) removing the buffer cells;
(viii) analysing the cells by mass cytometry in order to determine expression of the one or more molecules of interest by the one or more cell types of interest.

Additional Method Steps

In some embodiments the methods may comprise one or more additional method steps.

In some embodiments the methods comprise obtaining a sample containing a heterogeneous population of cells from a subject.

A sample may be from any tissue/organ or bodily fluid. The sample may comprise or may be derived from: a quantity of blood or a fraction thereof; a tissue sample or biopsy; a tumor sample or biopsy; pleural fluid; cerebrospinal fluid (CSF); or cells obtained from a subject. In some embodiments, the sample is obtained or derived from a tissue or tissues which are affected by a disease/condition (e.g. tissue or tissues in which symptoms of the disease manifest, or which are involved in the pathogenesis of the disease/condition).

Herein, a "subject" may be any animal or human. The subject is preferably mammalian, more preferably human. The subject may be a non-human mammal, but is more preferably human. The subject may be male or female. The subject may be a patient. A subject may have been diagnosed with a disease or condition requiring treatment, may be suspected of having such a disease/condition, or may be at risk of developing/contracting such a disease/condition. A subject may be undergoing treatment, or may have been treated, to treat/prevent a disease/condition.

In some embodiments the methods comprise obtaining/isolating cells from a sample. In some embodiments the methods comprise preparing a cell suspension from a sample.

In some embodiments the methods comprise subjecting a subject, sample, or cells obtained/isolated from a sample, to a particular condition/treatment.

In particular embodiments the methods comprise isolating peripheral blood mononuclear cells (PBMCs) from a blood sample. In particular embodiments the methods comprise isolating immune cells (e.g. tumor infiltrating immune cells, e.g. tumor-infiltrating lymphocytes (TILs)) from a tumor sample.

Numbered Paragraphs

The following numbered paragraphs (paras) provide further statements of features and combinations of features which are contemplated in connection with the present invention:

1. A method for evaluating the expression of one or more molecules of interest by cell types of interest within a heterogeneous population of cells, comprising:
   (i) sorting cells of the heterogeneous population of cells into two or more cell types based on expression of one or more cell type markers by the cells;
   (ii) labelling the sorted cell types with one or more cell type-specific identifiers;
   (iii) labelling the cells with target-binding molecules capable of binding to one or more molecules of interest; and
   (iv) analysing the cells in order to determine expression of the one or more molecules of interest by the one or more cell types of interest.

2. The method according to para 1, wherein the method comprises mixing together the sorted, labelled cells of different cell types prior to analysis at step (iv).

3. The method according to para 1 or para 2, wherein the heterogeneous population of cells is sorted into the two or more cell types by fluorescence activated cell sorting (FACS).

4. The method according to any one of paras 1 to 3, wherein labelling the sorted cell types with one or more cell type-specific identifiers comprises: labelling the different sorted cell types using target-binding molecules conjugated to non-identical elemental isotopes, or labelling the different sorted cell types using target-binding molecules conjugated to non-identical fluorophores.

5. The method according to any one of paras 1 to 4, wherein labelling the cells with target-binding molecules capable of binding to one or more molecules of interest comprises: labelling the cells with target-binding molecules capable of binding to one or more molecules of interest using target-binding molecules conjugated to non-identical elemental isotopes, or labelling the cells with target-binding molecules capable of binding to one or more molecules of interest using target-binding molecules conjugated to non-identical fluorophores.

6. The method according to any one of paras 1 to 5, wherein analysing the cells in order to determine expression of the one or more molecules of interest by the cell types comprises analysis by mass cytometry or analysis by flow cytometry.

7. A method for evaluating the expression of one or more molecules of interest by one or more cell types of interest within a heterogeneous population of cells, comprising:
   (i) sorting cells of the heterogeneous population of cells into two or more cell types based on expression of one or more cell type markers by the cells as determined by flow cytometry;
   (ii) labelling the sorted cell types with target-binding molecules conjugated to an elemental isotope, wherein the different sorted cell types are labelled with target-binding molecules conjugated to non-identical elemental isotopes;
   (iii) labelling the cells with target-binding molecules capable of binding to one or more molecules of interest, using target-binding molecules conjugated to non-identical elemental isotopes; and
   (iv) analysing the cells by mass cytometry in order to determine expression of the one or more molecules of interest by the one or more cell types of interest.

8. A method for evaluating the expression of one or more molecules of interest by one or more cell types of interest within a heterogeneous population of cells, comprising:

(i) sorting cells of the heterogeneous population of cells into two or more cell types based on expression of one or more cell type markers by the cells as determined by flow cytometry;

(ii) labelling the sorted cell types with target-binding molecules conjugated to a fluorophore, wherein the different sorted cell types are labelled with target-binding molecules conjugated to non-identical fluorophores;

(iii) labelling the cells with target-binding molecules capable of binding to one or more molecules of interest, using target-binding molecules conjugated to non-identical fluorophores; and (iv) analysing the cells by flow cytometry in order to determine expression of the one or more molecules of interest by the one or more cell types of interest.

9. The method according to para 7 or para 8, wherein the method comprises mixing together the sorted, labelled cells of different cell types prior to analysis at step (iv).

10. The method according to any one of paras 1 to 9, wherein the method comprises analysing two or more heterogeneous populations of cells, and additionally comprises labelling one or more of the heterogeneous populations of cells with a population-specific identifier.

11. A method for evaluating the expression of one or more molecules of interest by one or more cell types of interest within two or more heterogeneous populations of cells, comprising:

(i) labelling the cells of one or more of the heterogeneous populations of cells with a population-specific identifier;

(ii) sorting cells of the heterogeneous populations of cells into two or more cell types based on expression of one or more cell type markers by the cells;

(iii) labelling the sorted cell types with one or more cell type-specific identifiers;

(iv) labelling the cells with target-binding molecules capable of binding to one or more molecules of interest; and (v) analysing the cells in order to determine expression of the one or more molecules of interest by the one or more cell types of interest.

12. The method according to para 11, wherein the method comprises mixing together the sorted, labelled cells of different cell types prior to analysis at step (v).

13. The method according to any one of paras 1 to 12, wherein the method additionally comprises mixing the labelled cell types with buffer cells.

14. The method according to para 13, wherein the buffer cells are labelled with target-binding molecules conjugated to magnetic beads.

15. The method according to para 13 or para 14, wherein the method additionally comprises separating the buffer cells from cells of the heterogeneous population of cells prior to analysing the cells in order to determine expression of the one or more molecules of interest.

16. The method according to any one of paras 1 to 15, wherein the heterogeneous population of cells is a population of immune cells.

17. The method according to any one of para 1 to 16, wherein the heterogeneous population of cells is a population of peripheral blood mononuclear cells (PBMCs).

The invention includes the combination of the aspects and preferred features described except where such a combination is clearly impermissible or expressly avoided.

The section headings used herein are for organizational purposes only and are not to be construed as limiting the subject matter described.

Aspects and embodiments of the present invention will now be illustrated, by way of example, with reference to the accompanying figures. Further aspects and embodiments will be apparent to those skilled in the art. All documents mentioned in this text are incorporated herein by reference.

Throughout this specification, including the claims which follow, unless the context requires otherwise, the word "comprise," and variations such as "comprises" and "comprising," will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment.

Methods described herein may be performed in vitro or in vivo. In some embodiments, methods described herein are performed in vitro. The term "in vitro" is intended to encompass experiments with cells in culture whereas the term "in vivo" is intended to encompass experiments with intact multi-cellular organisms.

BRIEF DESCRIPTION OF THE FIGURES

Embodiments and experiments illustrating the principles of the invention will now be discussed with reference to the accompanying figures.

FIGS. 4A to 4D. Histograms showing differences in the levels of expression of markers known to be differentially expressed as a consequence of stimulation PMA/ionomycin, in (4A) T cells, (4B) B cells, (4C) NK cells and (4D) myeloid cells, as determined by CyTOF analysis of stimulated (dark grey) and unstimulated (light grey) PBMC populations.

EXAMPLES

Figure 1:
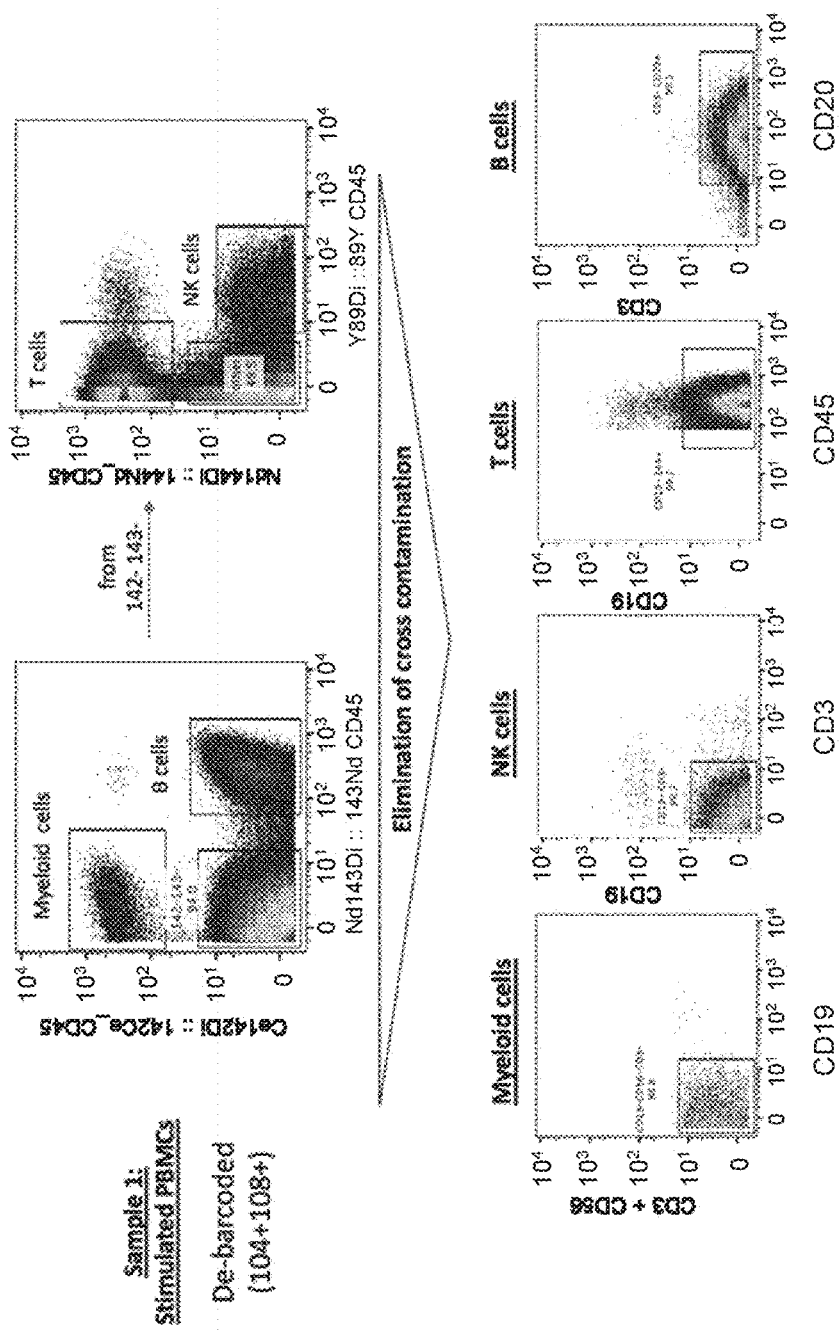
FIG. 1. Dot plots showing the deconvolution of four different PBMC subsets from within the PMA/ionomycin-stimulated (Pd104+, Pd108+) population based on the expression of different subset specific identifiers, as determined by CyTOF analysis. Percentages of cells having cell subtype-specific marker expression profiles are shown.

In the following Examples, the inventors illustrate the application of the methods of the invention to the high-resolution, high-throughput profiling of heterogeneous populations of cells.

Example 1: Analysis of Different Immune Cell Subsets in Stimulated Vs. Unstimulated PBMC Populations Peripheral blood mononuclear cells (PBMCs) isolated from blood samples obtained from healthy donor subjects were prepared and cultured in complete RPMI medium supplemented with 10% hiFCS (fetal calf serum, 1% penicillin/streptomycin/glutamine, 10 mM HEPES and 55 μM 2-mercaptoethanol (2-ME).

Cells were split into wells of a 96-well round bottom plate ($3 \times 10^6$ cells per well) and stimulated with 150 ng/ml phorbol-12-myristate-13-acetate (PMA) and 1 uM ionomycin, or left in medium alone (unstimulated) for 4 h at 37° C.

Cells were subsequently washed with PBS, and stimulated and un-stimulated cells were incubated for 20 mins with fluorescently-conjugated anti-human CD45 (APC, H130), CD56 (PE, HCD56), CD3 (Pacific Blue, UCHT1), CD19 (PerCP Cy5.5, HIB19) and live dead cell stain (Amcyan) on ice.

Cells were subsequently washed, and live fluorescently labelled immune cell subsets (CD45+) were sorted using an ARIA II flow cytometry cell sorting device (Beckton Dickinson).

Sorted CD4+ and CD8+ T cells (CD19−CD3+CD4+CD8−, CD19−CD3+CD8+CD4−), B cells (CD19+CD3−), NK cells (CD3−CD19−CD56+), and myeloid cells (CD19−CD3−CD56−) from both treatments were directly incubated with anti-CD45 antibody (HI-30), labelled with different metal isotopes. Specifically, NK cells were stained with Y-89-labelled anti-CD45 antibody, myeloid cells were stained with Ce-142-labelled anti-CD45 antibody, B cells were stained with Nd-143-labelled anti-CD45 antibody and T cells were stained with Nd-144-labelled anti-CD45 antibody.

Cells were washed with PBS, and each sorted population was seeded into an individual well of a 96-well round bottom plate followed by another washing step.

Buffer cells from healthy donor PBMCs were thawed and incubated with magnetically conjugated anti human CD45 antibodies (STEMCELL Technologies) in accordance with the manufacturer's instructions. Buffer cells were then washed and added to the sorted cell populations, to achieve a total number of $2.5 \times 10^6$ cells per well.

To enable the discrimination of live cells from dead cells, samples were incubated for 5 min on ice in 200 μM cisplatin.

Cells were then washed, and the different sorted populations were then stained for 30 min on ice with 50 μl of mixtures of metal-labelled antibodies, as follows:

| Metal Tag | NK Panel | Myeloid Panel | T cell Panel | B cell Panel | Tetramer Panel |
| --- | --- | --- | --- | --- | --- |
| Cd-112/114 | CD19 | CD19 | CD19 | CD14 | CD14 |
| Y-89 | CD45 | | | | |
| In-115 | CD57 | CD15 | CD57 | | CD15 |
| La-139 | | | | | |
| Ce-140 | | CD14 | | CD3 | |
| Pr-141 | GrB | CD56/CD3 | CD56 | CD56 | CD56 |
| Nd-142 | | CD45/HLA-DR (Tet) | | | HLA-DR |
| Nd-143 | | CD45 (Tet) | | CD45 | |
| Nd-144 | | | CD45 | | CD45 |
| Nd-145 | CD3 | CD68 | CD3 | CD69 | CD3 |
| Nd-146 | CD8 | CD31 | HLA-DR | IgD | CD8 |
| Sm-147 | CD34 | CD66ace | CD4 | IgG | CD4 |
| Nd-148 | | CLA | CD45RO | CXCR4 | CD45RO |
| Sm-149 | CD49a | CD13 | OX40 | CD38 | OX40 |
| Nd-150 | | CD103 | CD103 | CXCR5 | CD103 |
| Eu-151 | | CD64 | CD69 | CD27 | CD69 |
| Sm-152 | CD122 | CD1c | CD8 | CD1c | Tetramer |
| Eu-153 | CD103 | FcER1 | KLRG1 | | KLRG1 |
| Sm-154 | IL-18R | CD80 | CXCR5 | CD1d | Tetramer |
| Gd-155 | Tbet | CD33 | ICOS | IL-10 | ICOS |
| Gd-156 | FcER1a/CD123 | | TIGIT | CD10 | TIGIT |
| Gd-157 | Granzyme A | CXCR3 | CXCR3 | CD162 | CXCR3 |
| Gd-158 | CD56 | CD303 | CD27 | IgA | CD27 |
| Tb-159 | CD161 | CD123 | CD107a | CD22 | CD107A |
| Gd-160 | NKp44 | CD169 | PD-1 | CD43 | PD1 |
| Dy-161 | | CD172a | TIM3 | | TIM3 |
| Dy-162 | Ki67 | CD95 | CD161 | GM-CSF | CD161 |
| Dy-163 | CD127 | CD71 | CD127 | IL-10Ralpha | CD127 |
| Dy-164 | | CD141 | ITGB7 | CD40 | Tetramer |

-continued

| Metal Tag | NK Panel | Myeloid Panel | T cell Panel | B cell Panel | Tetramer Panel |
|---|---|---|---|---|---|
| Ho-165 | iCOS | CCR5 | CCR5 | CD19 | CCR5 |
| Er-166 | NK-46p | CD86 | CXCR1 | CD86 | Tetramer |
| Er-167 | | CX3CR1 | | IL-6 | |
| Er-168 | GATA3 | CD26 | CCR7 | CD11b | CCR7 |
| Tm-169 | CD25 | CCR2 | CD25 | CD24 | CD25 |
| Er-170 | 2B4 | CD88 | Vd2 | CD49d | Vd2 |
| Yb-171 | | CD34 | | CD20 | CRTH2 |
| Yb-172 | CD94 | CXCR4 | Va7.2 | CD21 | Va7.2 |
| Yb-173 | NKp30 | CD39 | CD39 | CD95 | CD28 |
| Yb-174 | | CD206 | CCR6 | CD25 | Tetramer |
| Lu-175 | CD11c | CD11c | CCR4 | FcRL4 | Tetramer |
| Yb-176 | CD39 | CD11b | CD28 | CD56 | CD39 |
| Bi-209 | CD16 | CD16 | CD16 | | CD16 |
| DNA Ir-191/193 | | | | | |
| Cisplatin 195 | | | | | |

Cells were then fixed in 2% paraformaldehyde in PBS overnight at 4° C.

Samples were then washed in permeabilization buffer, and cells from stimulated and unstimulated samples were labelled with unique combinations of palladium isotopes for 30 min on ice, to enable discrimination of samples from stimulated vs. unstimulated conditions (Pd104/Pd108 for stimulated, Pd102/Pd106 for unstimulated samples).

After washing, cells were resuspended in 250 nM iridium intercalator (DNA staining) in 2% paraformaldehyde/PBS at room temperature.

Cells were washed twice, and half of the total amount of the samples was pooled together in water. Buffer cells were removed by incubating the cells for 3 mins in the centre of a magnet (STEMCELL Technologies), and pouring off the supernatant. This step was repeated once and the final supernatant was adjusted to 0.5 million cells per ml $H_2O$. Samples were then acquired using a CyTOF® Helios system (Fluidigm).

After CyTOF acquisition, stimulated and unstimulated samples were manually de-barcoded followed by gating on the specific immune cell subsets, using the staining signal intensities from the cell subset specific live cell barcode tag using FlowJo software. Cells were further gated on live (cisplatin negative, DNA positive) events followed by the elimination of potential contaminating unrelated cell subsets using the signature markers from the individual panels (i.e., CD3, CD19, and CD56 for myeloid cells, CD19 and CD3 for NK cells, CD19 for T cells and CD3 and CD56 for B cells). The corresponding .fcs files for each subset and sample were exported and the unlabelled channels were re-written according to the individual panel specifics into the corresponding .fcs files using a custom R script.

Visualization of high dimensionality data was performed using UMAP as dimensionality reduction technique and CYTOGRAPHER®. Marker expression intensities within individual immune cell subsets were represented as heatplots and histograms.

FIG. 1 shows that labelling of FACS-sorted cells with cell subset-specific identifiers is robust, with no cross-contamination between live immune cell subsets of different kinds. Within the PMA/ionomycin-stimulated (Pd104+, Pd108+) population the purity of the myeloid cell fraction (Ce-142) was 98.8% (CD19−CD56−CD3− cells), of the NK cells (Y-89) 98.7% (CD3− CD19−), of the T cells (Nd-144) 99.7% (CD19−) and of the B cell fraction (Nd-143) 98.3% (CD3−CD20+).

Figure 2:
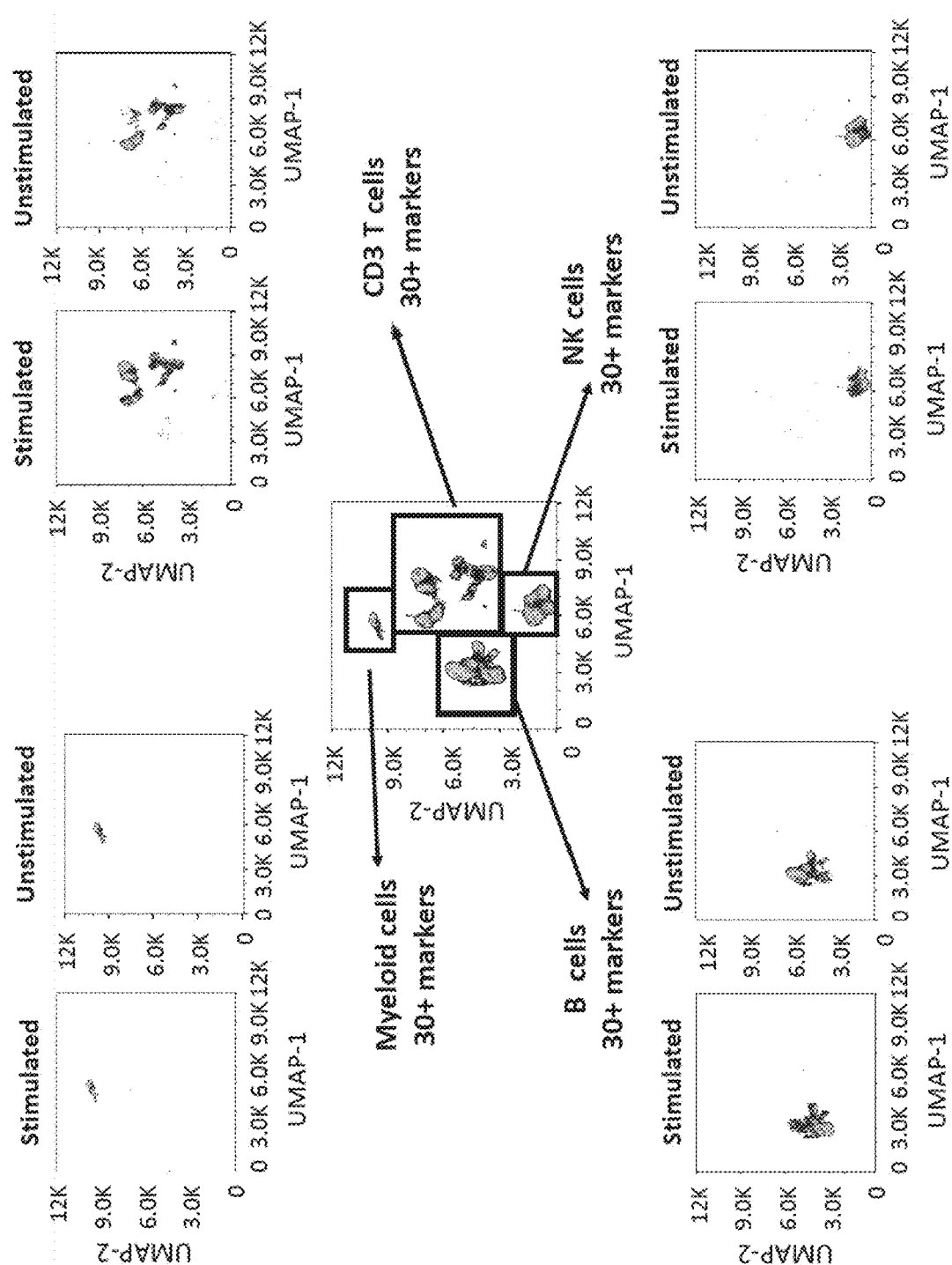
FIG. 2. UMAP plots showing high-dimensional overview of the expression of markers by different immune cell subsets, between PMA/ionomycin-stimulated and unstimulated conditions, as determined by CyTOF analysis.

FIG. 2 shows comparative high-dimensional overview of expression of markers by different immune cell subsets, between PMA/ionomycin-stimulated and unstimulated conditions.

Figure 3A:
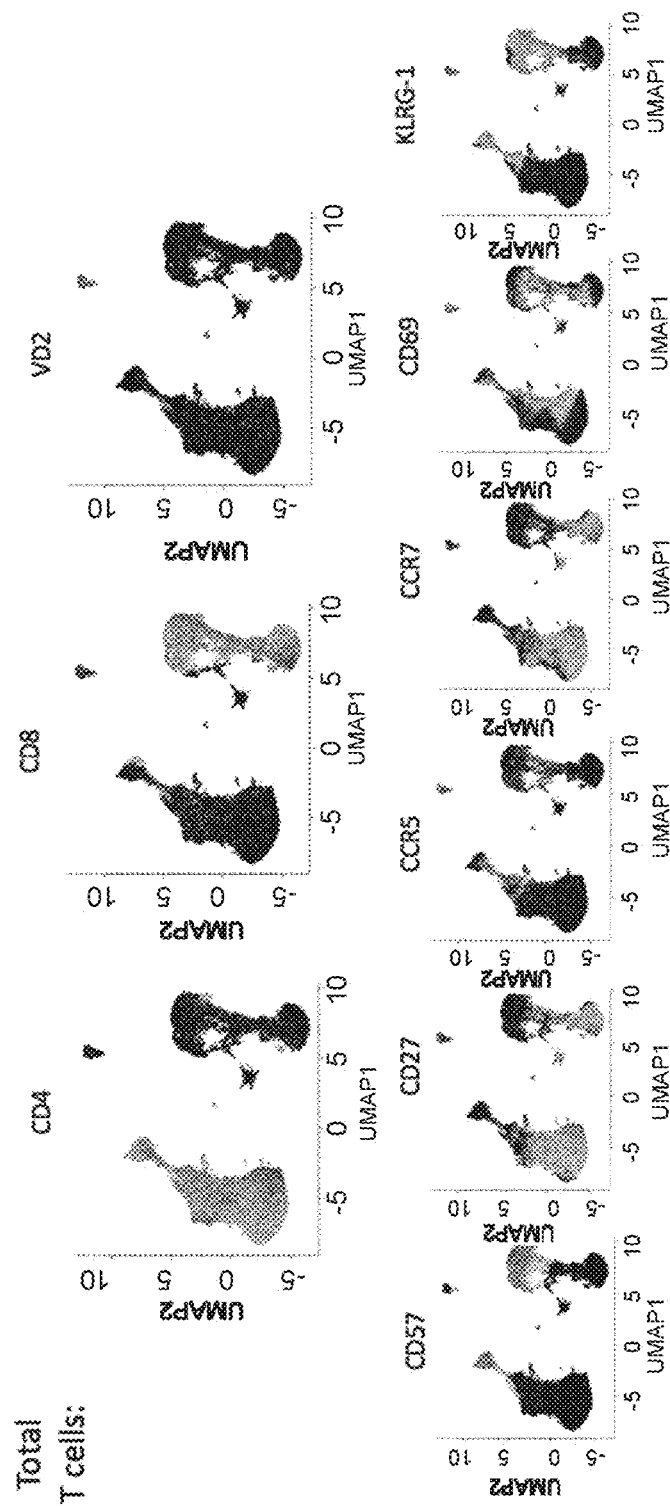
FIGS. 3A and 3B. UMAP plots showing the results of high-dimensional analysis of expression intensities for various different markers by (3A) T cells, and (3B) B cells, as determined by CyTOF analysis.

FIG. 3A shows the results of high-dimensional analysis of expression intensities for a variety of markers by T cells.

Figure 3B:
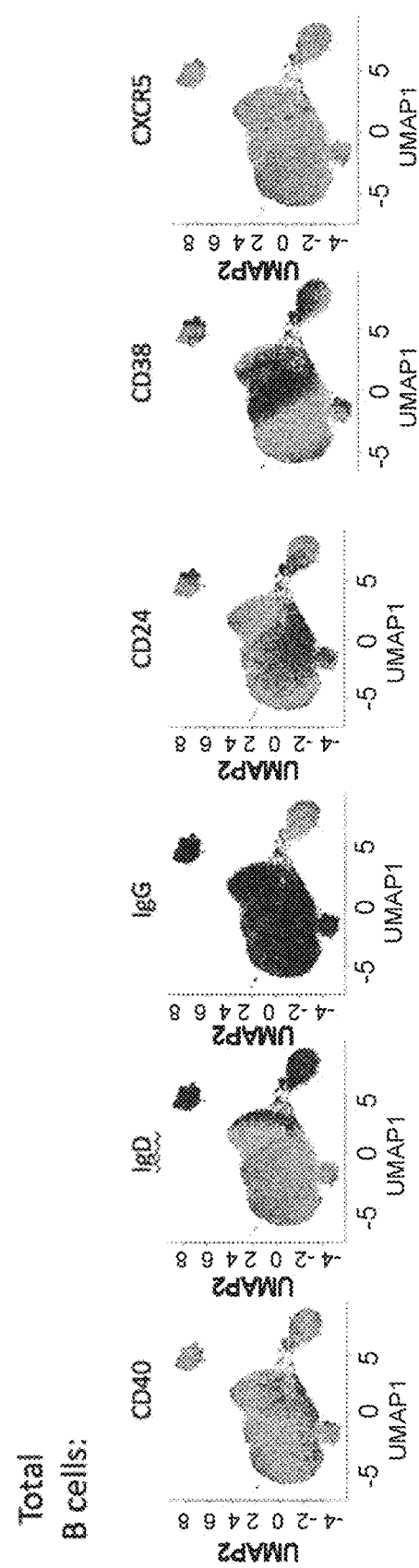

FIG. 3B shows the results of high-dimensional analysis of expression intensities for a variety of markers by B cells.

FIGS. 4A to 4D show differences in the level of expression of markers known to be differentially expressed as a consequence of stimulation PMA/ionomycin, in different immune cell subsets. The results confirm that the methods can be used to analyse, simultaneously, changes in the expression of various markers of interest, across different samples, in response to different experimental conditions.

Example 2: Parallel Analysis of Virus-Specific CD8+ T Cells and Myeloid Cells within Populations of PBMCs Obtained from Healthy Donors PBMCs from two healthy donors with mismatched HLA types were seeded into wells of a 96-well round bottom plate, stained with fluorescently-conjugated antibodies and live dead cell stain, and sorted into T cells and myeloid cells.

Sorted T cells (CD19−CD3+) and myeloid cells (CD19−CD3−CD56−) from the two different donors were directly incubated with anti-CD45 antibody (HI-30), labelled with different metal isotopes. Specifically, T cells were stained with Nd-144-labelled anti-CD45 antibody, and myeloid cells were stained with Ce-143-labelled anti-CD45 antibody.

Cells were washed with PBS, and each sorted population was seeded into an individual well of a 96-well round bottom plate followed by another washing step.

Buffer cells from healthy donor PBMCs were thawed and incubated with magnetically conjugated anti human CD45 antibodies (STEMCELL Technologies) in accordance with the manufacturer's instructions. Buffer cells were then washed and added to the sorted cell populations, to achieve a total number of $2.5 \times 10^6$ cells per well.

To enable the discrimination of live cells from dead cells, samples were incubated for 5 min on ice in 200 μM cisplatin.

Cells were then washed, and the sorted T cells were incubated with a cocktail consisting of different HLA-specific, viral peptide-loaded, metal-labelled tetramers for 1 h at room temperature (myeloid cells were incubated on ice during this period).

The T cells were then washed, and the T cells and myeloid cells were stained for 30 min on ice with 50 µl of mixtures of metal-labelled antibodies as shown in the Table of Example 1.

Cells were then fixed in 2% paraformaldehyde in PBS overnight at 4° C.

Samples were then washed and resuspended in 250 nM iridium intercalator (DNA staining) in 2% paraformaldehyde/PBS at room temperature.

Cells were washed twice, and T cells (donor 1) and myeloid cells (donor 2) were pooled in water, and depleted of buffer cells as described in Example 1. Samples were then acquired using a CyTOF® Helios system (Fluidigm), and analysed as described in Example 1.

Antigen-specific cells were identified by gating on CD8+ T cells within the T cell subset, followed by gating on tetramer positive cells.

Figure 5:
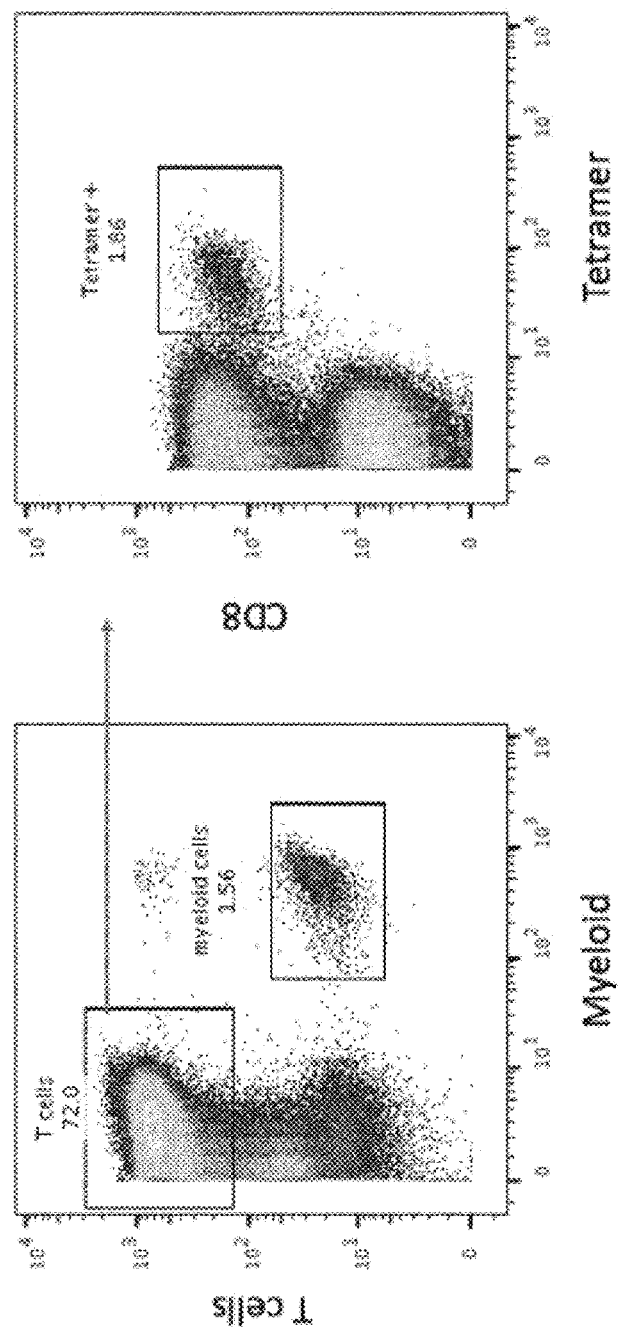
FIG. 5. Dot plots showing the results of analysis of proportions of immune cells expressing different markers as determined by CyTOF analysis.

FIG. 5 shows the detection of a CMV peptide-specific T cell population within the CD8+ T cell population.

Figure 6A:
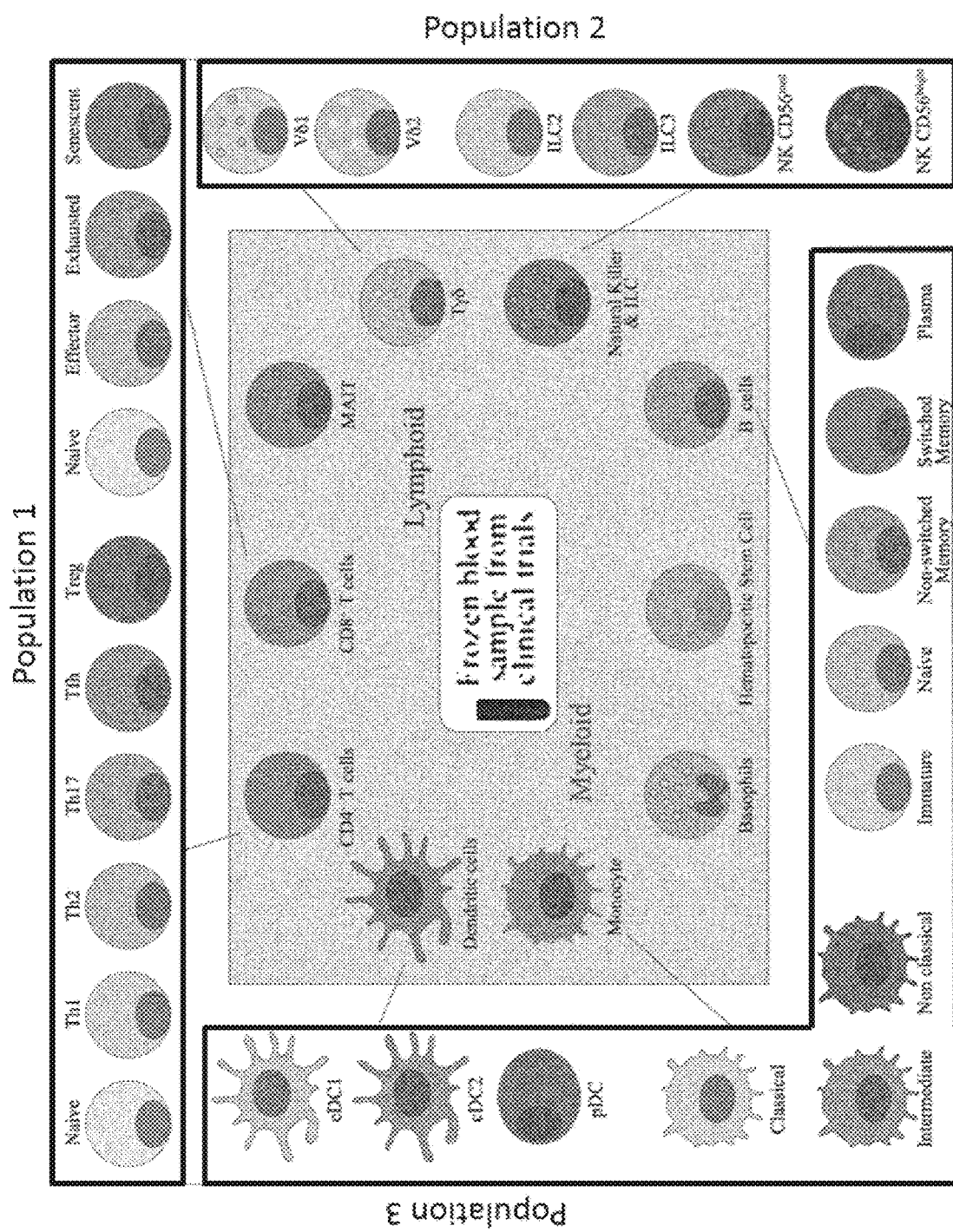
FIGS. 6A and 6B. Schematic overviews of (6A) the immune cell populations characterised in Example 3, and (6B) exemplary molecules of interest to be analysed in such populations.
Figure 6B:
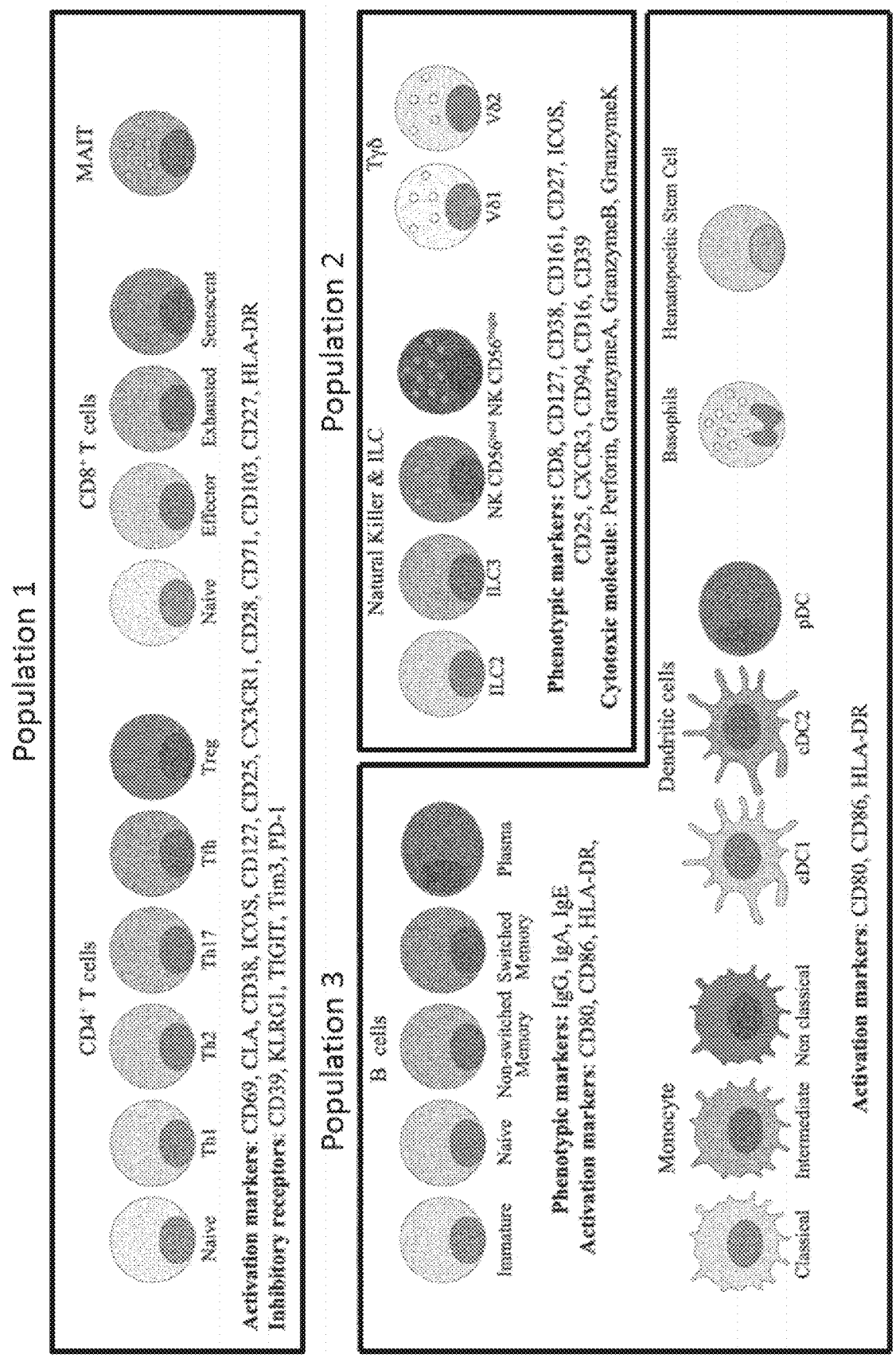

Example 3: Analysis of αβTCR-Expressing Cells, γδTCR-Expressing Cells, Innate Lymphoid Cells, NK Cells, Myeloid Cells, Basophils, B Cells and Hematopoietic Stem Cells within a Population of PBMCs The inventors employed the methods to the analysis of αβTCR-expressing cells, γδTCR-expressing cells, innate lymphoid cells, NK cells, myeloid cells, basophils, B cells and hematopoietic stem cells within populations of PBMCs (see FIGS. 6A and 6B).

Figure 7:
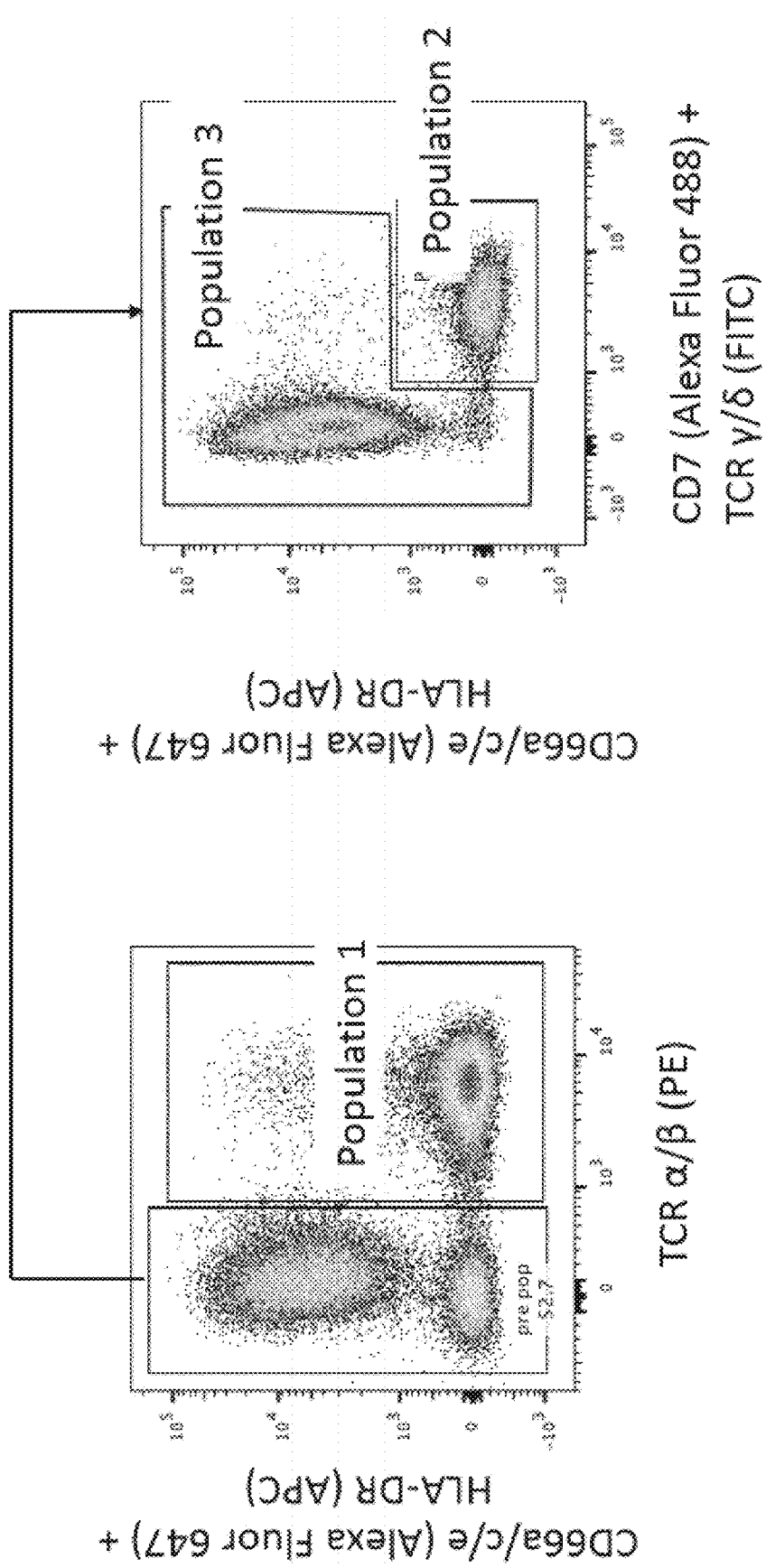
FIG. 7. Flow-cytometry dot plot showing the gating strategy used to sort Populations 1, 2 and 3 from PBMCs in Example 3. Cells were first gated on live cells (i.e. 7AAD-negative (not shown)). Population 1 was identified using PE-conjugated anti-TCRα/b antibody. Among αβTCR-negative cells, Population 2 was identified using AF488-conjugated anti-CD7 antibody, and FITC-conjugated anti-TCRg/d antibody. Population 3 was identified as αβTCR-negative, CD7-negative and γδTCR-negative cells.

Cryopreserved human PBMCs were obtained from STEMCELL Technologies. Frozen samples were thawed and washed in RPMI 10% FBS+DNAse (15 ug/ml). Cells were then stained with antibody cocktails containing αTCRα/b-PE (IP26—Biolegend), αTCRg/d-FITC (B1—Biolegend), αCD7-AlexaFuor488 (848438—R&D), αHLA-DR-APC (L234—Biolegend), αCD66a/c/e– Alexa-Fuor647 (ASL-32—Biolegend) and Fc block in PBS+0.5% BSA at 4° C., for 15 min. Cells were then washed twice in PBS+0.5% BSA. Prior to cell sorting, Live/dead marker (7AAD—Biolegend) was added according to the manufacturer's instructions. Cells were sorted into 3 populations, using an ARIA II flow cytometry cell sorting device (Beckton Dickinson)—see FIG. 7:

Population 1: αβTCR-expressing cells (αβTCR+)
Population 2: γδTCR-expressing cells, innate lymphoid cells and NK cells (αβTCR–, CD66a/c/e–, MHC Class II–, γδTCR+, CD7+)
Population 3: myeloid cells, basophils, B cells and hematopoietic stem cells (αβTCR–, TCRγδ–, CD7–)

Aliquots of the sorted populations were analysed to determine purity of the sorted populations, and their gross composition my mass cytometry. Briefly, population 1 cells were stained with metal isotope-conjugated anti-CD3 and anti-PE (i.e. binding to αTCRα/b-PE) antibodies, population 2 cells were stained with metal isotope-conjugated anti-CD3, anti-FITC (i.e. binding to αTCRg/d-FITC) and anti-CD56 antibodies, and population 3 cells were stained with metal isotope-conjugated anti-CD19, anti-CD14, anti-HLA-DR, anti-CD123, anti-CRTH2 and anti-CD34.

Figure 8A:
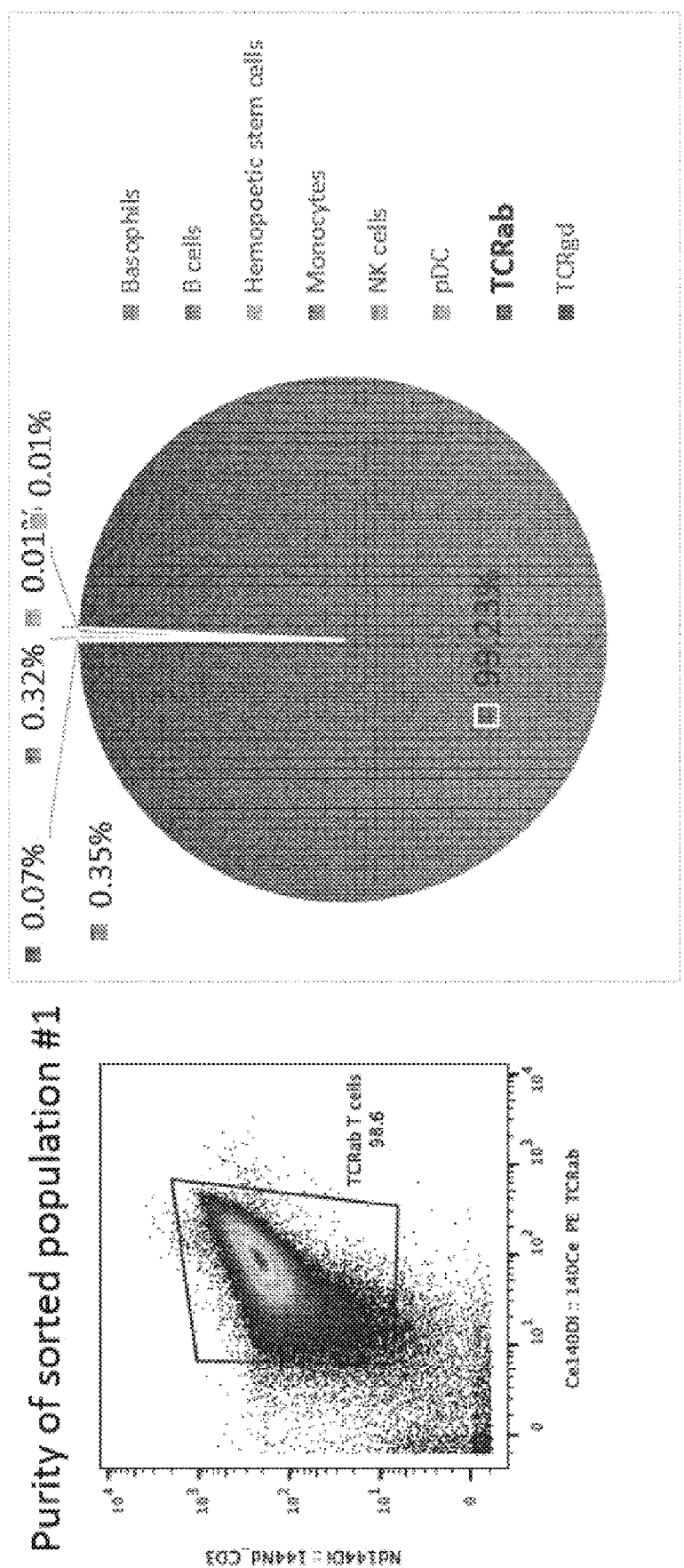
FIGS. 8A to 8C. Flow-cytometry dot plot and pie chart summarising the results of analysis of the purity and gross composition of sorted populations 1, 2 and 3 in Example 3. (8A) Population 1 cells were stained with anti-CD3 and anti-TCRα/b antibodies. (8B) Population 2 cells were stained with anti-CD3, anti-TCRg/d and anti-CD56 antibodies. (8C) Population 3 cells were stained with anti-CD19, anti-CD14, anti-HLA-DR, anti-CD123, anti-CRTH2 and anti-CD34.
Figure 8B:
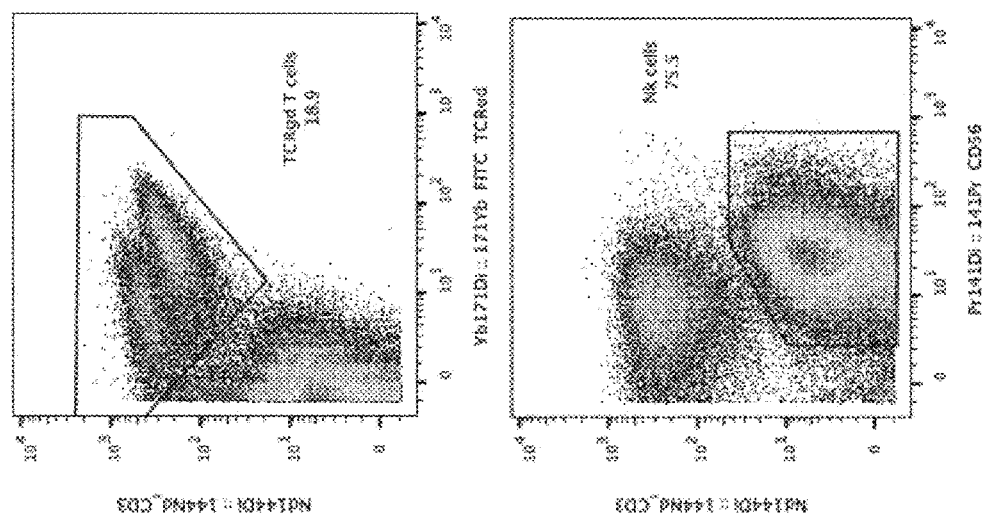
Figure 8C:
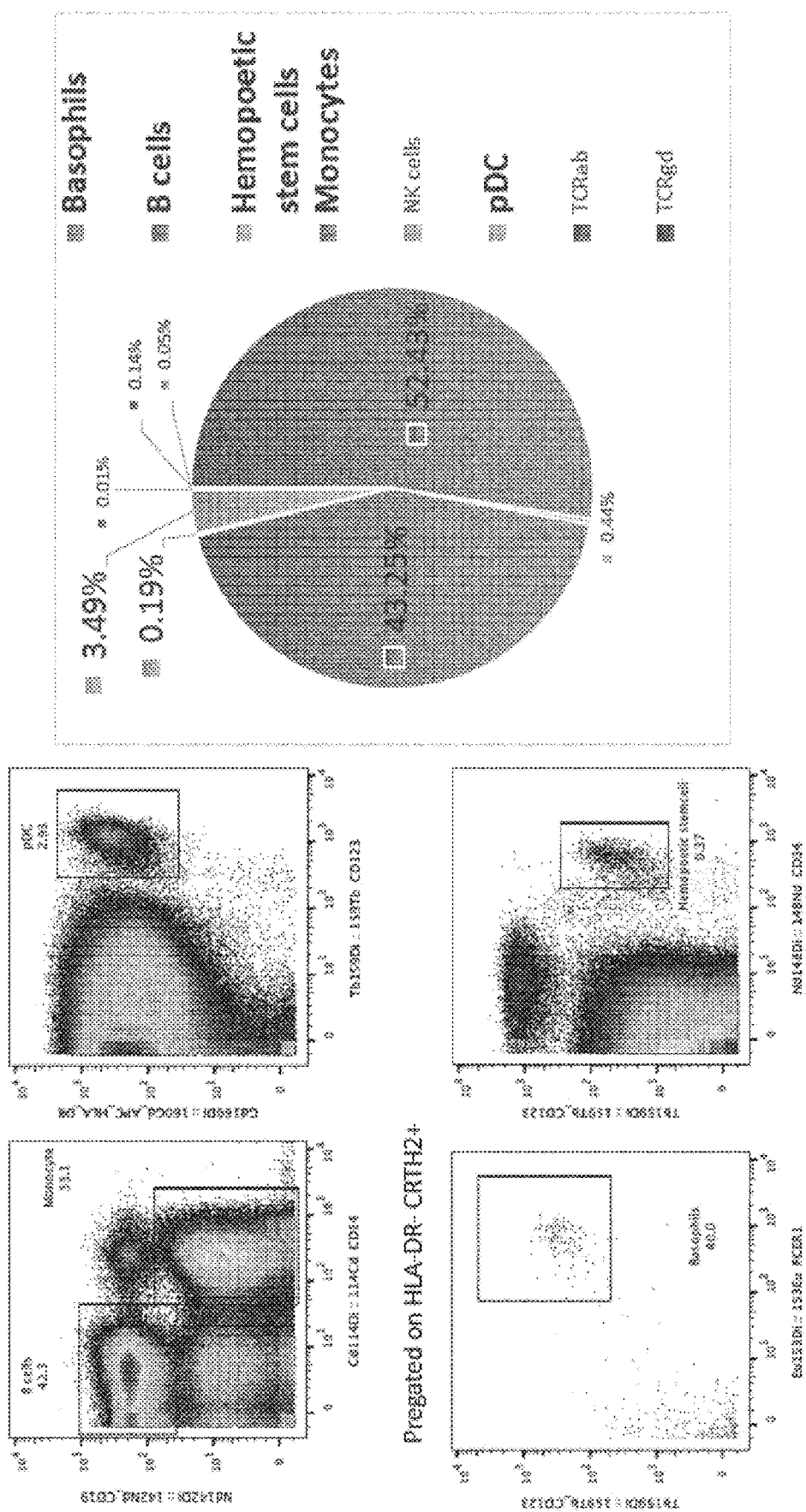

Population 1 contained 99.23% TCRαβ+ CD3+ cells (i.e. a γδ T cells; see FIG. 8A). Population 2 contained 79.35% CD3-CD56+ cells (i.e. NK cells) and 19.86% TCRγδ+CD3+ cells (i.e. γδ T cells; see FIG. 8B). Population 3 contained 52.43% CD19+CD14– cells (i.e. B cells), 43.25% CD14+ CD19– cells (i.e. monocytes), 3.49% MHC Class II+CD123+ cells (i.e. plasmacytoid DCs), 0.19% FCER1A+ CD123+ cells (i.e. basophils), and 0.44% CD34+ cells (i.e. hematopoietic stem cells; see FIG. 8C).

Cells of the sorted populations of cells are subjected to high-dimensional phenotypic analysis. Briefly, sorted populations 1, 2 and 3 are stained with different cocktails of antibodies labelled with different metal isotopes, in PBS+ 0.5% BSA at 4° C. for 15 min.

Population 1 cells are stained with antibodies labelled with non-identical metal isotopes for detecting CD45, CD14/CD19, CD57, TCRγδ*, CD103, CD56, Perforin, CD3, CD69, CD8a, CD4, CD45RO, CCR4, Granzyme B, CD38, KLRG1, ICOS, TIGIT, Granzyme K, CD27, CXCR3, PD-1, TIM3, CD161, CD127, HLA-DR, CXCR5, CHTR2, CCR7 and CD25.

*using metal isotope-labelled antibody capable of binding to the PE-labelled antibody used for FACS-sorting the TCRαβ-expressing cells.

Population 2 cells are stained with antibodies labelled with non-identical metal isotopes for detecting CD45, CD14/CD19, CD57, CD103, CD56, Perforin, CD3, CD69, CD8a, TCRγδ**, CD34, NKG2C, Granzyme B, CD38, KLRG1, ICOS, c-KIT, Granzyme K, CD27, Vd1, PD-1, Vd2, CD161, CD127, HLA-DR, NKp44, CHTR2, CCR7 and CD25.

**using metal isotope-labelled antibody capable of binding to the FITC-labelled antibody used for FACS-sorting the γδTCR-expressing cells.

Population 3 cells are stained antibodies labelled with non-identical metal isotopes for detecting CD45, CD103, CD20, CD5, CD88, CD14, CD45RA, CD34, CD89, IgG, CD38, CD123, ICOS, c-KIT, CD163, CD27, CADM1, IgM, CD301, IgA, IgE, HLA-DR, CXCR5, CHTR2, CCR7 and CD1c.

Cells were then washed twice in PBS+0.5% BSA, and subsequently stained with cisplatin (as a viability marker) 5 µM in PBS at 4° C. for 5 min. After two washing steps, cells were fixed in PBS+PFA 2% overnight. Prior to CyTOF acquisition, cells were stained for DNA according to the manufacturer's instructions (#201192B—Fluidigm).

After CyTOF acquisition, any zero values are randomised using a uniform distribution of values between zero and minus-one using an R script (as was the default operation of previous CyTOF software). All other integer values measured by the mass cytometer are randomized in a similar fashion by default. The signal of each parameter is then normalised based on EQ beads (Fluidigm) as described in Finck et al., Cytometry A (2013) 83(5):483-942013. Files (.fcs) are analysed using FlowJo (Tree Star Inc.).

The method provides for high-dimensional analysis of immune cell subsets, and of markers of properties/activities of the cells.

Example 4: Analysis of αβTCR-Expressing Cells, γδTCR-Expressing Cells, Innate Lymphoid Cells, NK Cells, Myeloid Cells, Basophils, B Cells and Hematopoietic Stem Cells within a Population of PBMCs in Conjunction with Tetramer Staining Cryopreserved human PBMCs obtained from STEMCELL Technologies are thawed and washed in RPMI 10% FBS+DNAse (15 ug/ml).

Cells are incubated with a HLA-specific, viral peptide-loaded, metal-labelled tetramers for 1 h at room temperature.

The tetramer-labelled PBMCs are then stained with antibody cocktails and sorted into populations 1, 2 and 3 as described in Example 3 above.

The sorted populations of cells are then stained with different cocktails of antibodies labelled with different metal isotopes, in PBS+0.5% BSA at 4° C. for 15 min and analysed by CyTOF as described in Example 3 above.

The method provides for high-dimensional analysis of immune cell subsets, markers of properties/activities of the cells, and detection of cells specific for the viral peptide:HLA complex, in parallel.

Example 5: Parallel Analysis of αβTCR-Expressing Cells, γδTCR-Expressing Cells, Innate Lymphoid Cells, NK Cells, Myeloid Cells, Basophils, B Cells and Hematopoietic Stem Cells within Different Populations of PBMCs Cryopreserved human PBMC samples obtained from STEMCELL Technologies are thawed and washed in RPMI 10% FBS+DNAse (15 ug/ml). Individual PBMC samples are stained with anti-CD45 antibodies labelled with non-identical metal isotopes in PBS+0.5% BSA at 4° C. for 15 min. Cells of one PBMC sample are stained with 106Cd-labelled anti-CD45 antibody, and cells of another PBMC sample are stained with 110Cd-labelled anti-CD45 antibody, in PBS+0.5% BSA at 4° C. for 15 min.

The labelled PBMC samples are then stained with antibody cocktails and sorted into populations 1, 2 and 3 as described in Example 3 above.

The sorted populations of cells are then stained with different cocktails of antibodies labelled with different metal isotopes, in PBS+0.5% BSA at 4° C. for 15 min and analysed by CyTOF as described in Example 3 above.

The method provides for high-dimensional analysis of immune cell subsets, and of markers of properties/activities of the cells, within PBMCs from different samples, in parallel.

The invention claimed is:

1. A method for evaluating the expression of one or more molecules of interest by cell types of interest within a heterogeneous population of cells, comprising:
   (i) sorting cells of the heterogeneous population of cells into two or more cell types based on expression of one or more cell type markers by the cells;
   (ii) labelling the cells with target-binding molecules capable of binding to one or more molecules of interest, comprising labelling the different sorted cell types with target-binding molecules capable of binding to non-identical molecules of interest; and
   (iii) analysing the cells in order to determine expression of the one or more molecules of interest by the one or more cell types of interest.

2. The method according to claim 1, wherein the method further comprises labelling the sorted cell types with one or more cell type-specific identifiers prior to analysis at step (iii).

3. The method according to claim 1, wherein the method comprises mixing together the sorted, labelled cells of different cell types prior to analysis at step (iii).

4. The method according to claim 1, wherein the heterogeneous population of cells is sorted into the two or more cell types by fluorescence activated cell sorting (FACS).

5. The method according to claim 1, wherein labelling the cells with target-binding molecules capable of binding to one or more molecules of interest comprises: labelling the cells with target-binding molecules capable of binding to one or more molecules of interest using target-binding molecules conjugated to non-identical elemental isotopes, or labelling the cells with target-binding molecules capable of binding to one or more molecules of interest using target-binding molecules conjugated to non-identical fluorophores.

6. The method according to claim 2, wherein labelling the sorted cell types with one or more cell type-specific identifiers comprises: labelling the different sorted cell types using target-binding molecules conjugated to non-identical elemental isotopes, or labelling the different sorted cell types using target-binding molecules conjugated to non-identical fluorophores.

7. The method according to claim 1, wherein analysing the cells in order to determine expression of the one or more molecules of interest by the cell types comprises analysis by mass cytometry or analysis by flow cytometry.

8. A method for evaluating the expression of one or more molecules of interest by one or more cell types of interest within a heterogeneous population of cells, comprising:
   (a)
      (i) sorting cells of the heterogeneous population of cells into two or more cell types based on expression of one or more cell type markers by the cells as determined by flow cytometry;
      (ii) labelling the cells with target-binding molecules capable of binding to one or more molecules of interest, comprising labelling the different sorted cell types with target-binding molecules capable of binding to non-identical molecules of interest using target-binding molecules conjugated to non-identical elemental isotopes; and
      (iii) analysing the cells by mass cytometry in order to determine expression of the one or more molecules of interest by the one or more cell types of interest;
   or
   (b)
      (i) sorting cells of the heterogeneous population of cells into two or more cell types based on expression of one or more cell type markers by the cells as determined by flow cytometry;
      (ii) labelling the cells with target-binding molecules capable of binding to one or more molecules of interest, comprising labelling the different sorted cell types with target-binding molecules capable of binding to non-identical molecules of interest using target-binding molecules conjugated to non-identical fluorophores; and
      (iii) analysing the cells by flow cytometry in order to determine expression of the one or more molecules of interest by the one or more cell types of interest.

9. The method according to claim 8, wherein the method further comprises labelling the sorted cell types of step (a) with target-binding molecules conjugated to an elemental isotope, wherein the different sorted cell types are labelled with target-binding molecules conjugated to non-identical elemental isotopes prior to analysis at step (a) (iii).

10. The method according to claim 8, wherein the method further comprises labelling the sorted cell types of step (b) with target-binding molecules conjugated to a fluorophores, wherein the different sorted cell types are labelled with target-binding molecules conjugated to non-identical fluorophores prior to analysis at step (b) (iii).

11. The method according to claim 8, wherein the method comprises mixing together the sorted, labelled cells of different cell types prior to analysis at step (a) (iii) or step (b) (iii).

12. The method according to claim 1, wherein the method comprises analysing two or more heterogeneous populations of cells, and additionally comprises labelling one or more of the heterogeneous populations of cells with a population-specific identifier.

13. A method for evaluating the expression of one or more molecules of interest by one or more cell types of interest within two or more heterogeneous populations of cells, comprising:
- (i) labelling the cells of one or more of the heterogeneous populations of cells with a population-specific identifier;
- (ii) sorting cells of the heterogeneous populations of cells into two or more cell types based on expression of one or more cell type markers by the cells;
- (iii) labelling the cells with target-binding molecules capable of binding to one or more molecules of interest, comprising labelling the different sorted cell types with target-binding molecules capable of binding to non-identical molecules of interest; and
- (iv) analysing the cells in order to determine expression of the one or more molecules of interest by the one or more cell types of interest.

14. The method according to claim 13, wherein the method further comprises labelling the sorted cell types with one or more cell type-specific identifiers prior to analysis at step (iv).

15. The method according to claim 13, wherein the method comprises mixing together the sorted, labelled cells of different cell types prior to analysis at step (iv).

16. The method according to claim 13, wherein the method comprises mixing together sorted, labelled cells of the same type from the two or more heterogeneous populations of cells prior to analysis at step (iv).

17. The method according to claim 1, wherein the method additionally comprises mixing the labelled cell types with buffer cells.

18. The method according to claim 17, wherein the buffer cells are labelled with target-binding molecules conjugated to magnetic beads.

19. The method according to claim 17, wherein the method additionally comprises separating the buffer cells from cells of the heterogeneous population of cells prior to analysing the cells in order to determine expression of the one or more molecules of interest.

20. The method according to claim 1, wherein the heterogeneous population of cells is a population of immune cells or a population of peripheral blood mononuclear cells (PBMCs).

* * * * *